United States Patent
Narazaki et al.

(10) Patent No.: US 6,926,380 B2
(45) Date of Patent: Aug. 9, 2005

(54) INK JET RECORDING APPARATUS PROVIDED WITH INTERRUPT CONTROL CIRCUIT AND METHOD FOR CONTROLLING RECORDING APPARATUS

(75) Inventors: Sadatoshi Narazaki, Chiba (JP); Sohei Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 10/082,182

(22) Filed: Feb. 26, 2002

(65) Prior Publication Data

US 2002/0118235 A1 Aug. 29, 2002

(30) Foreign Application Priority Data

Feb. 28, 2001 (JP) ........................................ 2001-054917

(51) Int. Cl.[7] .............................. B41J 29/38; B41J 2/165
(52) U.S. Cl. ............................ 347/5; 347/29; 358/1.13; 358/1.14
(58) Field of Search ..................... 347/5, 29; 358/1.13, 358/1.14, 1.15; 710/15; B41J 29/38, 2/165; G06F 15/00, 3/00; G06K 1/00

(56) References Cited

U.S. PATENT DOCUMENTS

| 5,163,153 A | | 11/1992 | Cole et al. |
| 5,182,583 A | * | 1/1993 | Horigome et al. ............. 347/19 |
| 5,262,872 A | * | 11/1993 | Yoshimura et al. .......... 358/296 |
| 5,428,379 A | * | 6/1995 | Kaneko et al. ................ 347/23 |
| 5,581,668 A | * | 12/1996 | Oida et al. .................. 358/1.14 |
| 5,652,607 A | * | 7/1997 | Masaki ........................... 347/5 |
| 5,933,581 A | * | 8/1999 | Miyazaki et al. ........... 358/1.14 |
| 6,081,663 A | * | 6/2000 | Takahashi et al. ............. 703/20 |
| 6,412,900 B2 | * | 7/2002 | Horigome ..................... 347/19 |
| 6,511,150 B1 | * | 1/2003 | Yoda et al. .................... 347/23 |

FOREIGN PATENT DOCUMENTS

| EP | 0 676 686 | 10/1995 |
| EP | 0 782 924 | 7/1997 |
| EP | 1 046 979 | 10/2000 |
| JP | 8-44453 | 2/1996 |
| WO | WO 91/00566 | 1/1991 |

* cited by examiner

*Primary Examiner*—Stephen D. Meier
*Assistant Examiner*—Leonard S. Liang
(74) *Attorney, Agent, or Firm*—Fitzpatrick, Cella, Harper & Scinto

(57) ABSTRACT

For an ink jet recording apparatus that utilizes the STOP mode function of a CPU to reduce power consumption and a method for controlling the recording apparatus, many NMI interrupts occur due to chattering generated upon switching when the trigger for the restoration from the STOP mode is effectuated by use of the power switch, and the normal ON/OFF process for the power supply is disabled. For example, therefore, an ink jet recording apparatus, which is provided with a CPU having plural modes including a mode to reduce the power consumption by suspending the clock signal as an operational mode, and receives a signal from a power switching unit as an NMI interrupt signal for the execution of NMI interrupt process, is arranged to be provided with a controller for prohibiting the NMI interrupt until operation is completed by way of the status of the recording apparatus with respect to the NMI interrupt process to be executed by the input of the signal from the power switching unit.

6 Claims, 15 Drawing Sheets

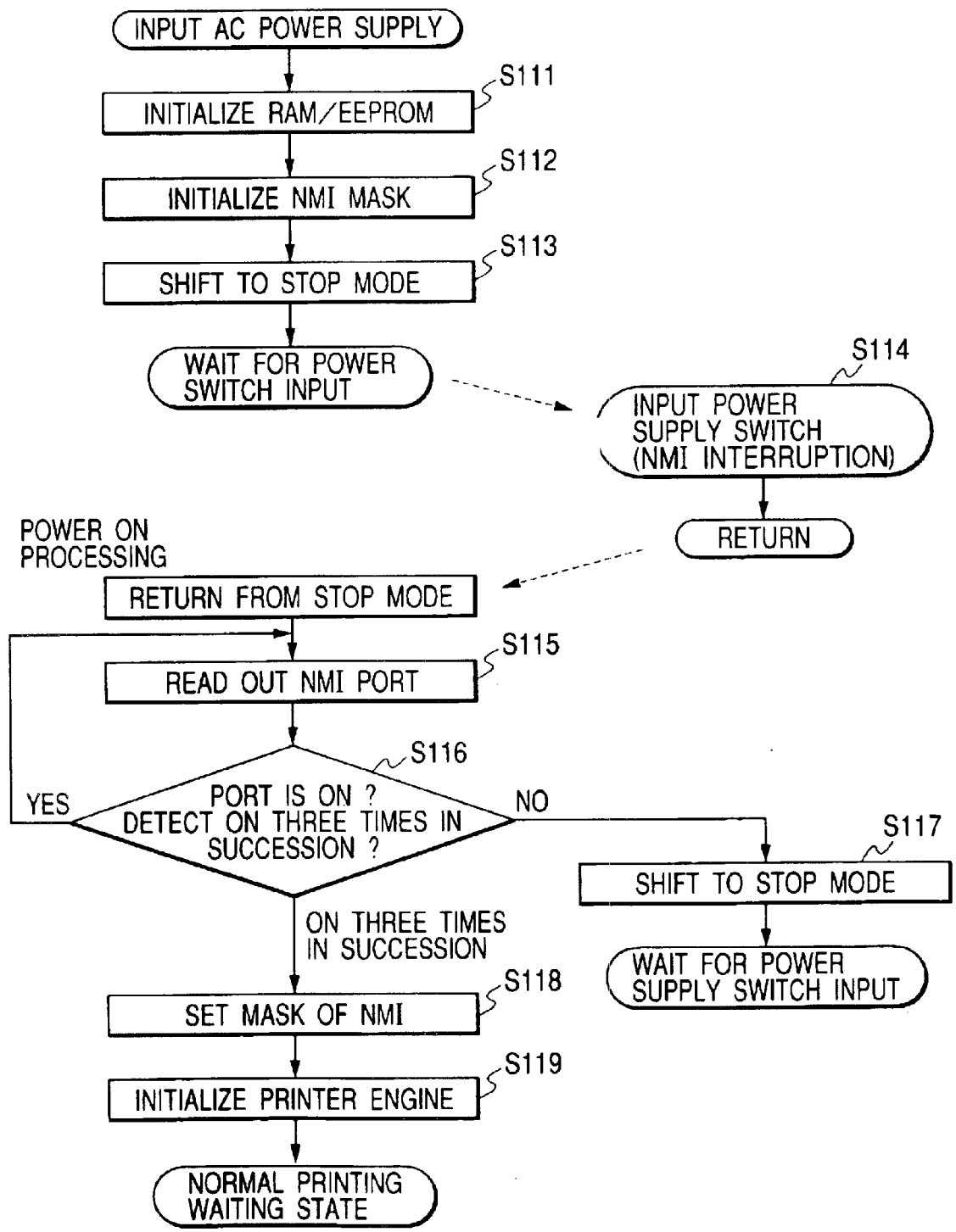

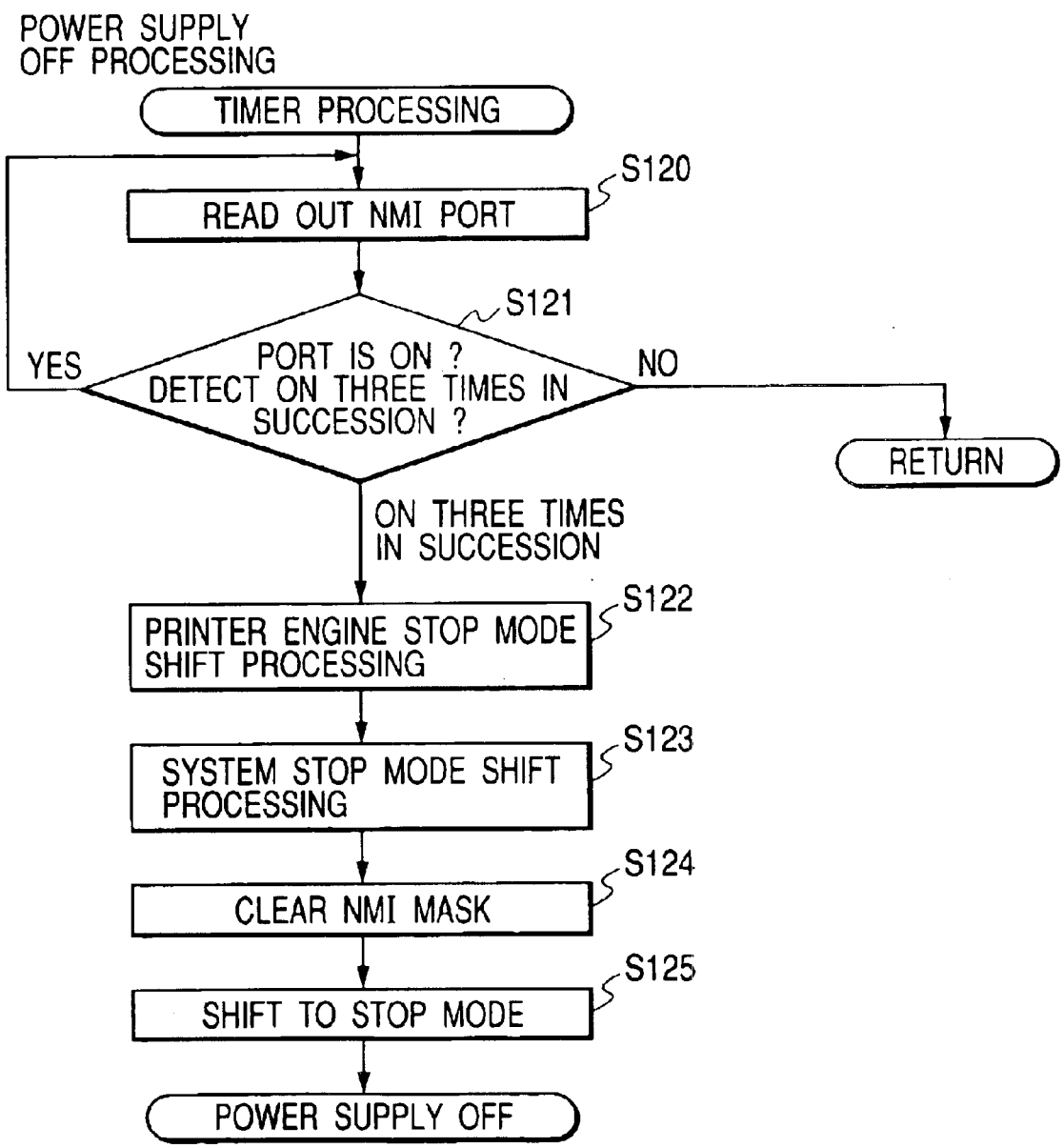

INK JET RECORDING APPARATUS PROVIDED WITH INTERRUPT CONTROL CIRCUIT AND METHOD FOR CONTROLLING RECORDING APPARATUS

BACKGROUND OF THE INVENTION

1. Field of the Invention

The present invention relates to an ink jet recording apparatus. More particularly, the invention relates to a control circuit for controlling the power supply on and off of an ink jet recording apparatus with the energy saving mode that uses the stop function of clock signal of a microprocessor and an NMI interrupt. The invention also relates to a method for controlling such recording apparatus.

2. Related Background Art

In recent years, there have been developed various portable personal computers of notebook type or laptop type, which are easily portable, and operative by a battery as well. Also, besides computer equipment, many kinds of low-power consumption equipment have been developed. For the equipment of such kind, various devices have been designed to save electric power in order to make the driving time as long as possible for a battery used or to suppress the power dissipation during the standby period.

For example, to make the power consumption for a CPU smaller, it is devised to slow down the operational speed of the CPU for reducing the current consumed by the CPU. Now that the CPU current consumption is almost proportional to the frequency of input clock signal, the frequency of the input signal is reduced to perform a low-frequency operation or if the clock signal completely stops, the current consumption is reduced. As a result, it becomes possible to reduce the power consumption. Fundamentally, the STOP clock function (hereinafter referred to as the STOP mode) possessed by a CPU is used for the implementation thereof. Besides this, the operation of a CPU is suspended temporarily (hereinafter referred to the HALT mode) so as to reduce dynamic current consumption for the reduction of the power consumption. However, it is impossible to operate the clock signal of a CPU at a low frequency or to reduce the current consumption more than the STOP mode in which the clock signal stops completely.

FIG. 5 is a view that shows the transmitting status of a CPU. Now, in conjunction with FIG. 5, a description will be made of the significant difference between the HALT mode and the STOP mode in terms of the power consumption.

At first, the HALT mode 52 is the one in which the operational clock signal of a CPU stops. However, the supply of clock signal to the incorporated peripheral circuits other than the CPU is continued for the consecutive operation. Therefore, although the total power consumption of the system can be reduced, it is impossible to reduce the current consumption of the incorporated peripheral circuits.

Here, the operation of the CPU itself is at rest, thus making the current consumption smaller than that of the normal mode 51.

On the other hand, the STOP mode 50 is such as to stop the clock generator together with the operational clock signal of the CPU, hence suspending the CPU entirely. As a result, the core circuit of the CPU and the operation of the incorporated peripheral circuits come to a stop, respectively. Under such circumstances, the STOP mode 50 results in the consumption of the static current consumption only, and if the C-MOS process is adopted for the manufacturing process of a CPU, it becomes possible to reduce the power consumption still more.

As described above, there is a significant difference between the HALT mode 52 and the STOP mode 50 in terms of the current consumption. Therefore, when a low-power consumption computer system is developed, the STOP mode 50 is utilized more often at present.

Generally, for switching to the HALT mode 52 and the STOP mode 50, the shift from, the normal mode 51 to the STOP mode 50 or to the HALT mode 52 is effected by means of a software control. For example, as indicated by the status shift shown in FIG. 5, the shift is made to the HALT mode 52 by the execution of the HALT command, and the shift to the STOP mode 50 by means of the mode setting to the CPU inner register for use of the STOP mode setting.

When shifting to the HALT mode 52 or the STOP mode 50 once, the supply of clock signal partly or totally stops. Therefore, only with the reset signal or interrupt signal from the external circuit, the normal operation mode 51 can be restored.

Conventionally, for the computer control equipment that controls the power supply by means of software (programming), there is a need for the CPU to operate at all times in order to control the power supply, and even in a state of the power supply being cut off, the CPU and the peripheral circuits are in operation. As a result, it is impossible to lessen the power consumption. Recently, therefore, with the utilization of a CPU having the aforesaid STOP mode 50, there has been designed a method for reducing the power consumption in a state of the power supply being cut off by means of the STOP mode 50.

Nevertheless, in order to restore the normal mode 51 from the STOP mode 50, there is no alternative but to use the NMI signal (Non Maskable Interrupt) and a reset signal for such restoration as shown in FIG. 5. To adopt such method, it is devised, as shown in FIG. 6, to utilize the signal from the power supply switch as the trigger signal for such restoration.

In FIG. 6, a reference numeral 61 designates the power switch to issue the power supply ON/OFF command; 62, a resistor; and 63, a capacitor that forms an RC filter in cooperation with the resistor 62 to eliminate noise signals from the power switch 61. The output signal from the RC filter forms an NMI signal 64 that disables the mask for the CPU 65. Also, a reference numeral 66 designates the power supply circuit that supplies the power output to all the necessary systems; and 67, a sub-power supply circuit that supplies the minimum power when the CPU is in the STOP mode. In this case, power is supplied only to the CPU.

In a case of such conventional example, an inexpensive switch of mechanical contact type is used in general. The switch of mechanical contact type is such as to condition the contact point in contact while it is depressed. Structurally, therefore, an instantaneous bouncing of the contacts tends to occur when the contacts are connected or cut off. Then, even for one-time depression of the power switch 61, the so-called chattering takes place electrically as if depressed several times when the power switch contact is ON at 70 or the power switch contact is OFF at 71 for the power switch 61 as shown in FIG. 7. As a result, noise signals occur in the NMI signal 64.

Now, it is assumed that the NMI signal 64 of the CPU 65 rises to actuate the interrupt at the edge timing, and the NMI is actuated several times eventually by one-time depression of the power switch 61 on standby in the STOP mode 50 as shown in FIG. 7. Also, at the time of the power switch contact being OFF at 71, the same chattering occurs. In other words, for the NMI signal 64, the interrupt process of NMI1 at 72, NMI2 at 73, NMI3 at 74, NMI4 at 75, NMI5 at 76, NMI6 at 77, NMI7 at 78, and NMI8 at 79 is executed continuously. In this case, there is no alternative for the CPU 64 but to execute the process of NMI signal 65, which is the interrupt process of the highest priority to disable the interrupt prohibition process by use of software. Therefore, during the restoration process from the STOP mode 50 with the first NMI1 at 72 being triggered, the next request of the same process is further made unexpectedly for the NMI2 at 73 to the NMI8 at 79. Then, depending on the cases, the CPU 65 runs away or the control system is put out of order eventually. Furthermore, there is encountered a problem that if the continuous NMI (at 72 to 79) interrupt should take place while an actuator is initialized for restoration by use of a control system or the like that utilizes an actuator, such as a motor, the initialization of the actuator is suspended eventually, among some other problems.

In order to prevent such situations, a resistor 62, a capacitor 63, and other elements are used to form the RC filter or the like, which is inserted into the NMI signal 64, but it is difficult to adjust the time constant of the RC filter in accordance with noises in various cases. Also, if the behavior of noise generation from the mechanical contacts is not necessarily uniform, it is difficult to effectuate the complete elimination thereof.

Also, since the switch is of mechanical contact type, it can be depressed at any time whenever the user intends to do so, and even if the aforesaid chattering problem is solved by use of the RC filter, the situation still remains the same as the occurrence of chattering if the user depresses the power switch in succession in a short period of time.

Also, in the specification of Japanese Patent Application Laid-Open No. 08-44453, a method for suspending the system clock signal of a CPU is disclosed as a method for lessening the power consumption for an apparatus. In the case of this method, it is necessary for the CPU to release the gate circuit of interrupt prohibition in order to generate the NMI that is the trigger signal for suspending the clock signal of the CPU. Also, there is a need for the provision of the delayed time required for securing the execution time of software. Therefore, if the NMI signal is generated by use of the power switch key, for example, which is asynchronous to the CPU operation, for the execution of the power control, there is a problem encountered that the gate circuit cannot be released, hence making it impossible to generate the NMI signal eventually.

As described above, for the control of an ink jet recording apparatus (printer) that utilizes the STOP mode function of the CPU in order to reduce the power consumption, there occur many interrupts of the highest priority that disable masking due to chattering noises generated by switching if the power switch is used for triggering for restoration from the STOP mode. Then, the multiple nesting of the interrupt process of the highest priority occurs inevitably. As a result, the restoration process is caused to run away or the initialization of actuator is disabled to terminate normally in the system or the like for which the actuator is provided, among some other malfunctions that may ensue. Fundamentally, it is anticipated to generate one NMI signal per each depression of the power switch, but in case of an inexpensive contact type switch, chattering is a problem that cannot be avoided, and at the same time, there is a possibility that the user depresses the mechanical switch unexpectedly.

Since there is no means for avoiding this situation, there is such a problem as to execute the restoring process again while the system is being restored to normal mode from the STOP mode or depending on the cases, the power switch interrupt executes the processing sequence of the power OFF during the restoration process, because of the software control of the power ON/OFF. As a result, the power supply of the system is cut off despite the user turning ON the power supply. Thus, the problem is encountered here that the system shifts to the STOP mode again after all.

SUMMARY OF THE INVENTION

It is an object of the present invention to execute the ON/OFF control of the power supply of an ink jet recording apparatus by receiving the NMI signal exactly even if chattering occurs at the NMI terminals when the NMI signal of the CPU is utilized for the power supply ON/OFF control.

In order to achieve this object, the recording apparatus of the present invention is an ink jet recording apparatus, which is provided with a CPU having plural modes including a mode to reduce the power consumption by suspending the clock signal as an operational mode, and receiving a signal from power switching means as an NMI interrupt signal for the execution of NMI interrupt process, and comprises non-volatile memory means for retaining a power supply status flag; user logic circuit means for outputting a trigger signal; a mask signal generating portion for receiving the trigger signal to generate an NMI interrupt mask signal; a gate circuit for making the signal from power switching means invalid by the mask signal; and control means for initiating the operation of the recording apparatus in accordance with the flag at the time of the execution of the NMI interrupt process by the input of the signal from the power switching means, changing the flag, changing the operational mode of the CPU, and setting the user logic circuit means to prohibit the NMI interrupt until the operation is completed, and enabling the user logic circuit means to output the trigger signal in accordance with the setting, and the mask signal generating portion to generate the mask signal for making the signal from the power switching means invalid.

Another recording apparatus of the invention is an ink jet recording apparatus, which is provided with a CPU having plural modes including a mode to reduce the power consumption by suspending the clock signal as an operational mode, and executes the NMI interrupt process with the input of signal from power switching means as NMI interrupt signal, and comprises abnormality detection means for detecting an abnormality; user logic circuit means for outputting a trigger signal; a mask signal generating portion for receiving the trigger signal to generate an NMI interrupt mask signal; a gate circuit for making the signal from power switching means invalid by the mask signal; and control means for setting the prohibition of the NMI interrupt for the user logic circuit means in accordance with an abnormal signal from the abnormality detecting means, and outputting the trigger signal in accordance with the setting to enable the mask signal to be output from the mask signal generating portion to the gate circuit in accordance with the output trigger signal for making the signal from the power switching means invalid.

Another recording apparatus of the invention is an ink jet recording apparatus, which is provided with a CPU having plural modes including a mode to reduce the power consumption by suspending the clock signal as an operational mode, and input means for inputting a signal from power supply switching means as an NMI interrupt signal for executing the NMI interrupt process, and comprises user logic circuit means for outputting a signal; a mask signal generating portion for receiving the trigger signal to generate an NMI interrupt mask signal; a gate circuit for making the signal from power switching means invalid by the mask signal; and control means for setting the prohibition of the NMI interrupt for the user logic circuit means when the NMI interrupt signal is inputted by the input means for a designated number subsequent to the NMI interrupt process executed by the input of the signal from the power switching means, and enabling the user logic circuit means to output the trigger signal in accordance with the setting, and the mask signal generating portion to generate the mask signal in accordance with the output of the trigger signal for making the signal from the power switching means invalid.

The method of the present invention for controlling a recording apparatus is the one for an ink jet recording apparatus, which is provided with a CPU having plural modes including a mode to reduce the power consumption by suspending the clock signal as an operational mode, and executes an NMI interrupt process with the input of signal from power switching means as an NMI interrupt signal, and which comprises the steps of retaining a power supply status flag on non-volatile memory means; outputting a trigger signal from user logic circuit means; and generating a mask signal in the NMI interrupt signal generating portion for the NMI interrupt when the trigger signal is received. For this controlling method, the operational process of the ink jet recording apparatus is executed in accordance with the flag retained in the flag retaining step when the NMI interrupt process is executed by the signal from the power switching means, and the flag retained in the flag retaining process is updated in the trigger signal outputting step for outputting the trigger signal in accordance with the setting for the user logic circuit, and mask signal is generated in the mask signal generating step in accordance with the trigger signal for making the signal from the power switching means invalid by the generation of the mask signal until the operational process is completed.

Another method of the invention for controlling a recording apparatus is the one for an ink jet recording apparatus, which is provided with a CPU having plural modes including a mode to reduce the power consumption by suspending the clock signal as an operational mode, and executes an NMI interrupt process with the input of a signal from power switching means as an NMI interrupt signal, and which comprises the steps of detecting an abnormality by abnormality detection means; retaining a power supply status flag on non-volatile memory means; outputting a trigger signal from user logic circuit means; and generating a mask signal in the NMI interrupt signal generating portion for the NMI interrupt when the trigger signal is received. For this controlling method, the abnormality is detected in the abnormality detecting step to output the trigger signal in the trigger signal outputting step in accordance with the abnormality, and the mask signal is generated in the mask signal generating step in accordance with the output trigger signal for making the signal from the power switching means invalid by the generated mask signal.

Another method of the invention for controlling a recording apparatus is the one for an ink jet recording apparatus, which is provided with a CPU having plural modes including a mode to reduce the power consumption by suspending the clock signal as an operational mode, and executes an NMI interrupt process with the input of a signal from power switching means as an NMI interrupt signal, and which comprises the steps of deciding whether or not the NMI interrupt signal is inputted into the input means a designated number of times; outputting a trigger signal from user logic circuit means; and generating a mask signal in the NMI interrupt signal generating portion for the NMI interrupt by receiving the trigger signal. For this controlling method, the NMI interrupt prohibition is set for the user logic circuit means when the input of the NMI interrupt signal is made in the designated number in the determining step subsequent to the NMI interrupt process executed by the input of a signal from the power switching means, and the trigger signal is output in the trigger signal generating step in accordance with the aforesaid setting for user logic circuit means to generate the mask signal in the mask signal generating step in accordance with the output of the trigger signal.

BRIEF DESCRIPTION OF THE DRAWINGS

FIGS. 11A and 11B are flowcharts that show the NMI sequence in accordance with the fourth embodiment.

DETAILED DESCRIPTION OF THE PREFERRED EMBODIMENT

Hereinafter, in conjunction with the accompanying drawings, the description will be made of a method of interrupt process and an apparatus in accordance with the embodiments of the present invention.

Figure 12:
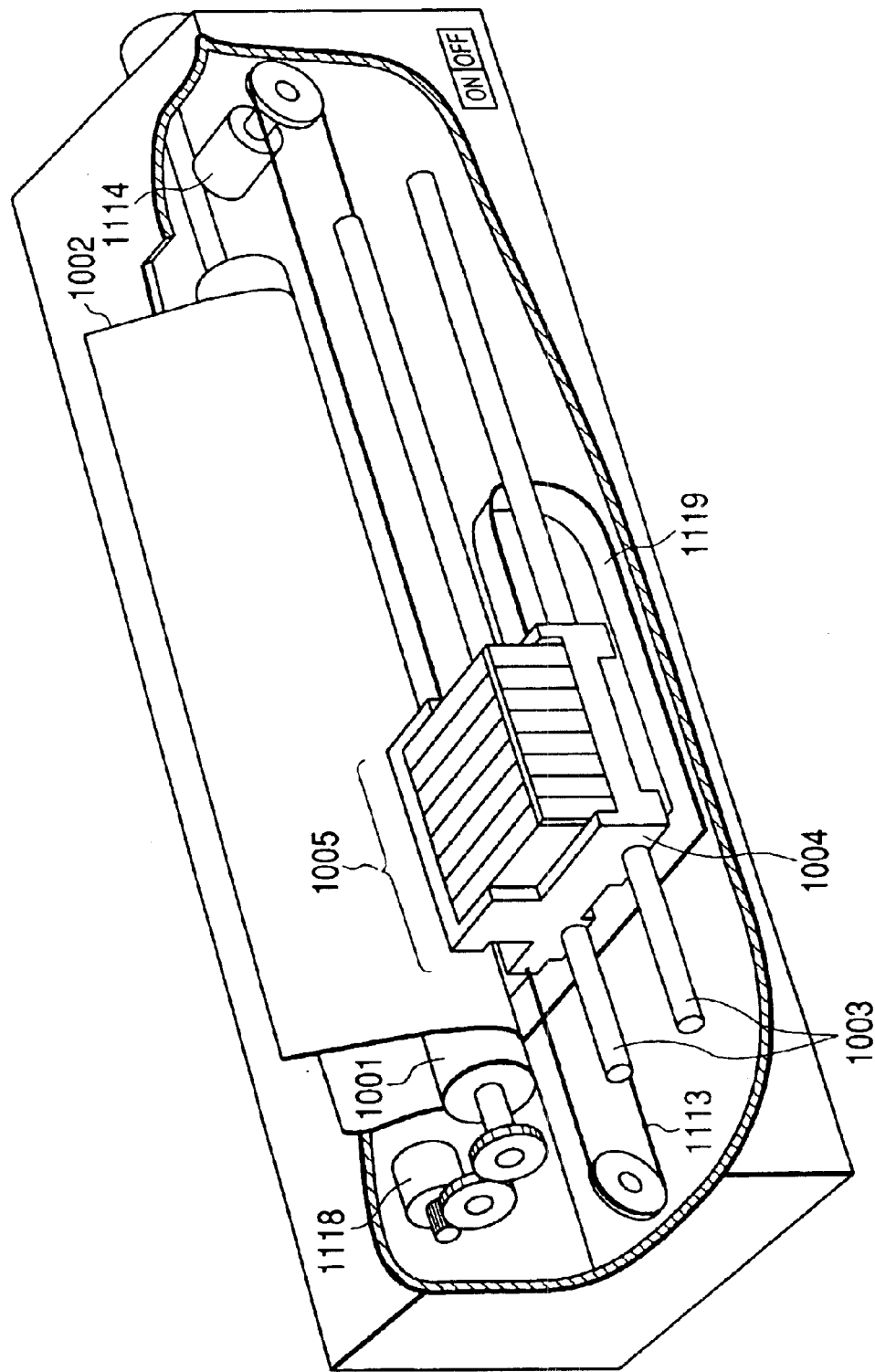
FIG. 12 is a perspective view that shows an ink jet recording apparatus.

FIG. 12 is a perspective view that shows an ink jet recording apparatus (printer) in accordance with the present invention.

Here, a reference numeral 1005 designates a recording head mounted on a carriage 1004, which is enabled to reciprocate along a shaft 1003 in the main scanning direction. Ink discharged from the recording head reaches a recording material 1002, the recording surface of which is regulated by a platen 1001 with a fine gap from the recording head, and forms images thereon.

To the recording head, discharge signals are supplied in accordance with image data through a flexible cable 119. In this respect, a reference numeral 1114 designates a carriage motor for enabling the carriage 1004 to scan along the shaft 1003; and 1113, the wire that transmits the driving power of the motor 1114 to the carriage 1004. Also, a reference numeral 1118 designates a feed motor coupled with a platen roller 1001 to convey the recording material 1002 in the sub-scanning direction.

First Embodiment

Figure 1A:
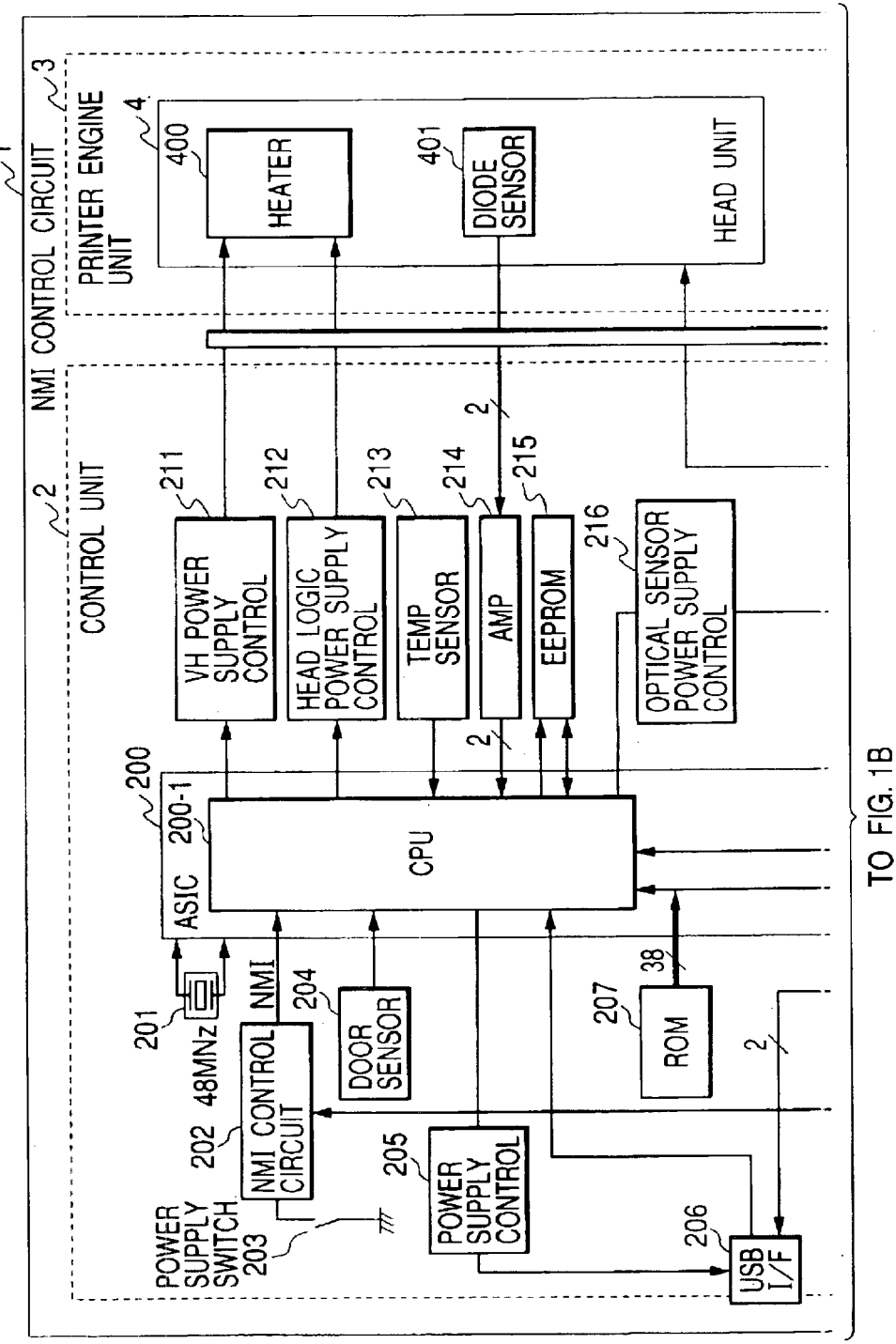
FIG. 1, which is comprised of FIGS. 1A and 1B, is a diagram that shows a first embodiment entirely.
Figure 1B:
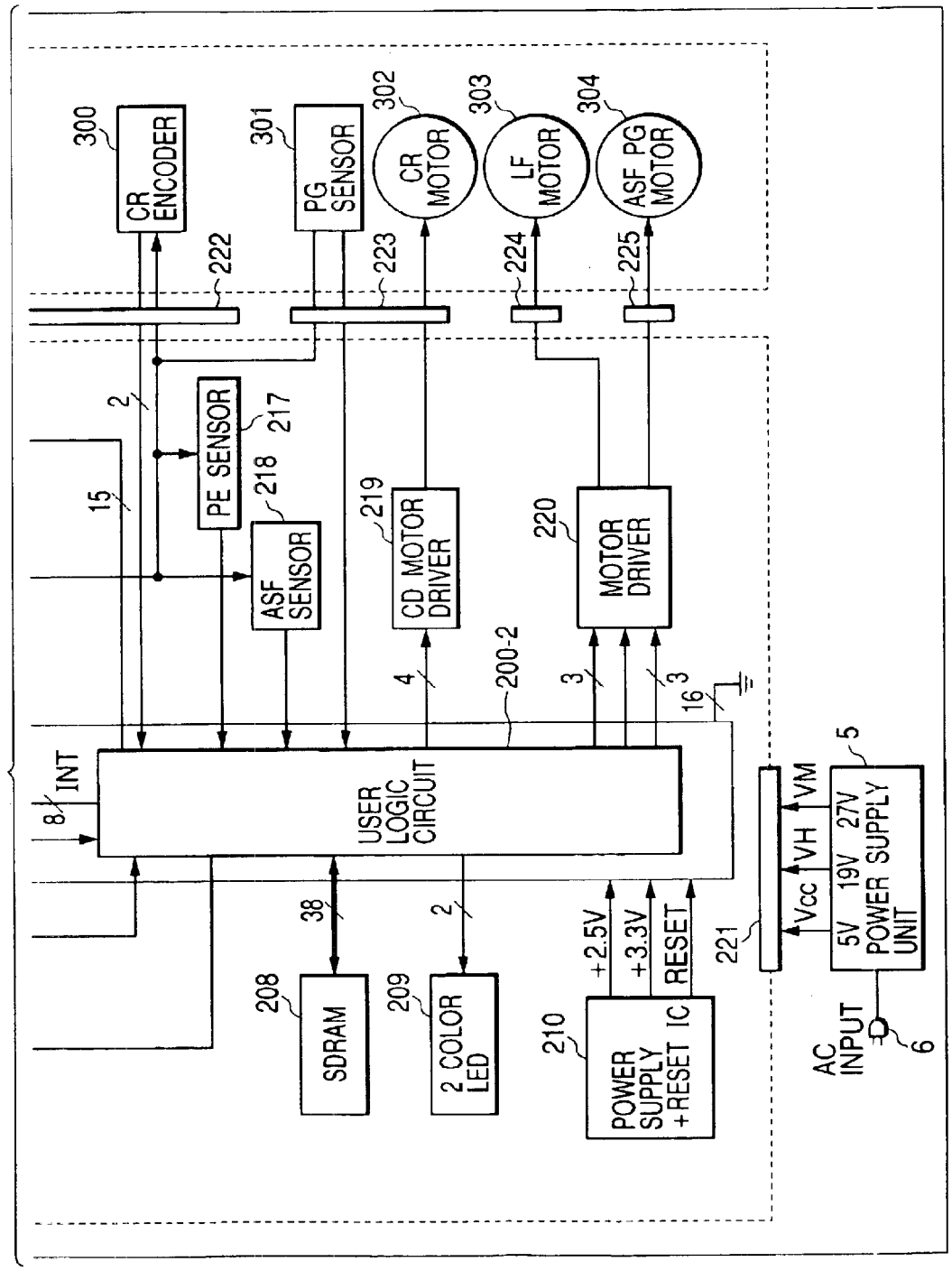

FIGS. 1A and 1B are block diagrams that show the entire body of an ink jet recording apparatus utilizing the STOP mode in accordance with a first embodiment of the present invention.

A reference numeral 1 designates a printer comprising a control unit 2, a printer engine unit 3, a head unit 4, a power supply unit 5, and an AC power cable 6.

A reference numeral 2 designates the control unit that controls the printer engine unit 3, which is formed by a CPU 200-1 having the STOP mode 50, and a user logic circuit 200-2.

A reference numeral 3 designates the printer engine unit comprising the head unit (recording head) 4 and a carriage mechanism (not shown) to control printing with the head unit 4, as well as a sheet feeding mechanism (not shown); an optical CR encoder 300 for detecting the carriage position; the carriage mechanism (not shown) that mounts a PG sensor 301 for detecting the recovery operation to prevent ink from being clogged in the nozzles of the recording head, and the head unit 4; the motor (hereinafter referred to as a CR motor) 302 that drives the carriage mechanism; the motor (hereinafter referred to as an LF motor) 303 to control sheet feeding; and a motor (hereinafter referred to as an ASF/PG motor) 304 that controls the automatic sheet feeding and the head recovery.

For the printer of the ink jet type, it is necessary to heat ink instantaneously for the generation of bubbles in ink to discharge ink from plural nozzles. Therefore, a heater 400 is assembled. To monitor the temperature rise of the heater 400, there is provided near the heater 400, the diode sensor 401 that utilizes the temperature characteristics of the diode.

Also, if the resistive value of each heater 400 is different, the quantity of heat generated by the heater 400 is affected to make it impossible to perform the generation of uniform bubbles. Then, it becomes difficult to print evenly. Here, therefore, the quantity of heat generated by each heater 400 is controlled to be constant.

To this end, for example, the resistive value of the heater 400 or the like is saved on the EEPROM 215 serving as a non-volatile RAM installed on the control unit 2, and at the time of printing (recording), the CPU uses such information, hence making it possible to perform the heater control for printing in good condition.

A reference numeral 5 designates the power supply unit for generating three-system DC outputs needed for the printer of the present embodiment, and 6, an AC cable for the AC power input to supply 100 VAC or 220 VAC to the power supply unit 5. The power supply unit 5 outputs from the AC input at 6 the VCC (5-V) voltage for use in the system logic; the VH (19-V) voltage for use in driving the heater 400; and the VM (27-V) voltage for driving the CR motor 302, LF motor 303, and ASF motor 304.

A reference numeral 200 des ignates the custom IC on which the CPU 200-1 and the user logic circuit 200-2 integrally formed on a silicon chip. The CPU 200-1 is the CPU that has the function of the STOP mode 50. The user logic circuit 200-2 is formed by the read/write controller of the SDRAM 208 which will be described later, the interrupt controller, the address control circuit, the versatile port, the motor driving circuit 219, the motor control circuit 220 and the DMA controller, among some other components.

A reference numeral 201 designates the crystal oscillator that generates the clock signal for operating the control unit or the like, and by means of an oscillation circuit (not shown) incorporated in the CPU 200-1 it oscillates the clock signal at 48 MHz.

A reference 202 designates the NMI control circuit of the present embodiment that controls the power ON/OFF signal from the power switch 203, which is the NMI control circuit to control the NMI signal, that is, the interrupt signal for controlling the power supply sequence. With the NMI signal, the CPU 200-1 executes the restoration from the STOP mode 50 to the normal operation mode 51 or executes the shift from the normal operation mode 51 to the STOP mode 50.

A reference numeral 204 designates a sensor for detecting the open and close of the access cover of the printer, and when the access cover is open for replacing ink tanks, for example, the operation of the printer is suspended temporarily to keep it on standby.

A reference numeral 205 designates the circuit that controls the USB interface signal line for controlling whether or not data can be transmitted from the host computer (not shown) connected with the connector of the USB interface at 206.

For example, if the printer 1 is being initialized to make it impossible to prepare for receiving data from the host computer, the USB signal is compulsorily turned OFF under the control of the CPU 200-1 to disable the host computer to recognize the printer 1 as a USB equipment.

A reference numeral 207 designates the Read Only Memory (hereinafter referred to as a ROM) that stores the information of acceleration, deceleration, and the like of the motor driving circuits 219, 220, and the like that control the programs and motors for controlling the system hereof.

A reference numeral 208 designates the readable and writable memory (hereinafter referred to as a RAM) used as the work area, the development area for received data, or the like for the system hereof.

A reference numeral 209 designates the two-color light emitting diode that serves as the indication device to indicate the normal condition of the power supply, the printer errors, or the like by changing the colors of emitting light.

A reference numeral 210 designates the power supply reset IC serving as the power supply circuit that converts the 5-V voltage supplied from the power supply unit 5 further to 2.5-V voltage and 3.3-V voltage. Also, it has a dual function to output the reset signal in the control unit by monitoring the output of 5-V power supply of the power supply unit 5.

A reference numeral 211 designates the circuit that controls the driving power supply for the heater 400, which is controlled to apply voltage only to the heater 400 of the head unit 4, which is engaged in printing in accordance with the control of the CPU 200-1. Therefore, the head driving voltage VH is not applied to the head unit 4 on standby or the like.

Likewise, a reference numeral 212 designates the circuit that controls the power supply to the logic circuit for controlling the head unit 4. It applies voltage only to the head unit 4 in printing as in the case of the head driving voltage VH.

A reference numeral 214 designates the amplification circuit serving as the amplifier for use of the diode sensor 401 to monitor the temperature rise of the heater 400 installed on the head unit 4.

A reference numeral 215 designates the non-volatile memory that stores the information, such as the consumed amount of ink, which should be stored even in a state of the power supply being cut off.

A reference numeral 216 designates the power supply control circuit for the optical sensor that cuts off current to the light emitting diode of the optical sensor when the printer 1 is on standby, thus reducing the power consumption, while making the life of the sensor longer. For example, therefore, the printer 1 is provided with the CR encoder 300, the PE sensor 217 for detecting the unavailability of printing sheet, the sheet feed sensor 218 of the automatic sheet feeding mechanism, and the like, and current to each diode of these sensors on the light emitting side is cut off when the printer is on standby.

Reference numerals 219 and 220 designate the driving circuits of the CR motor 302, LF motor 303, and ASF/PG motor 304 installed on the printer engine unit 3, and control sheet feeding, sheet expelling, recovering, and the like by the motor control circuits (not shown) incorporated in the user logic circuit.

A reference numeral 221 designates a power supply connector; 222, a flat cable connector that connects the control unit 2 and the head unit 4 of the printer engine unit 3; and 223 to 225, connectors that connect each of the motors 302 to 304 installed on the printer engine unit 3.

Next, in conjunction with FIG. 2, FIG. 3 and the flowcharts shown in FIGS. 4A and 4B, the operation of the present embodiment will be described in detail.

Figure 2:
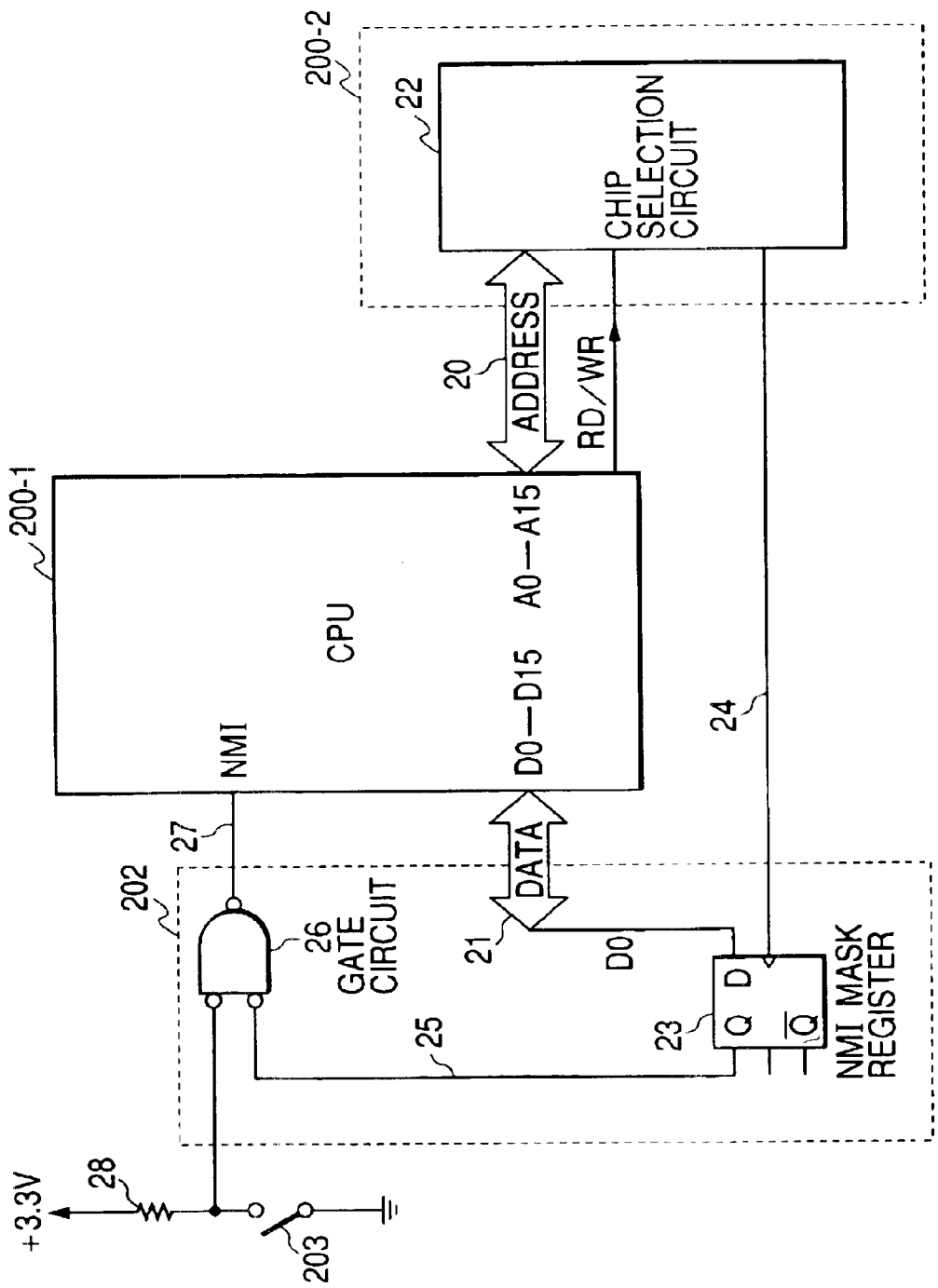
FIG. 2 is a view that shows the details of the first embodiment.

In FIG. 2, a reference numeral 200-1 designates the CPU and 200-2, the user logic circuit, which comprise, as described earlier, the read/write controller of the SDRAM 208, the interrupt controller, the address control circuit, the versatile port, the motor driving circuit 219, the motor control circuit 220, and the DMA controller, among some others.

A reference numeral 20 designates the address bus of the CPU, which is connected with the address decoder is of the user logic circuit 200-2 and the chip selection circuit 22; 202, the NMI control circuit formed by the NMI mask register 23 and the gate circuit 26 connected with the data bus 21 of the CPU 200-1. The register set signal 24 from the address decoder and the chip selection circuit 22 is connected to the clock of the NMI Mask register 23, and samples the data bus D0 signal of the CPU 200-1, for example.

The NMI mask 25, which is the output of the NMI Mask register 23, is connected to one of the inputs of the gate circuit 26 to logically control signals from the power switch 203. With the NMI signal 27 output from the gate circuit 26, which is connected to the NMI input of the CPU 200-1, the CPU 200-1 executes the NMI processing program stored on the ROM 207 by use of the logically controlled NMI signal 27 as a trigger. Here, a reference numeral 28 designates a current restriction resistor.

In FIGS. 1A and 1B, when the AC input 6 is actuated, the power supply unit 5 outputs each of the power supply outputs VCC, VH, and VM. However, the VH and VM are prohibited by the control signal from the controller in the CPU 200-1 to supply electric power to the VH power supply control 211, and also, prohibited by the head logic power supply control 212 to supply electric power to each of the driving systems. Therefore, only the system logic power supply VCC is supplied.

Figure 4A:
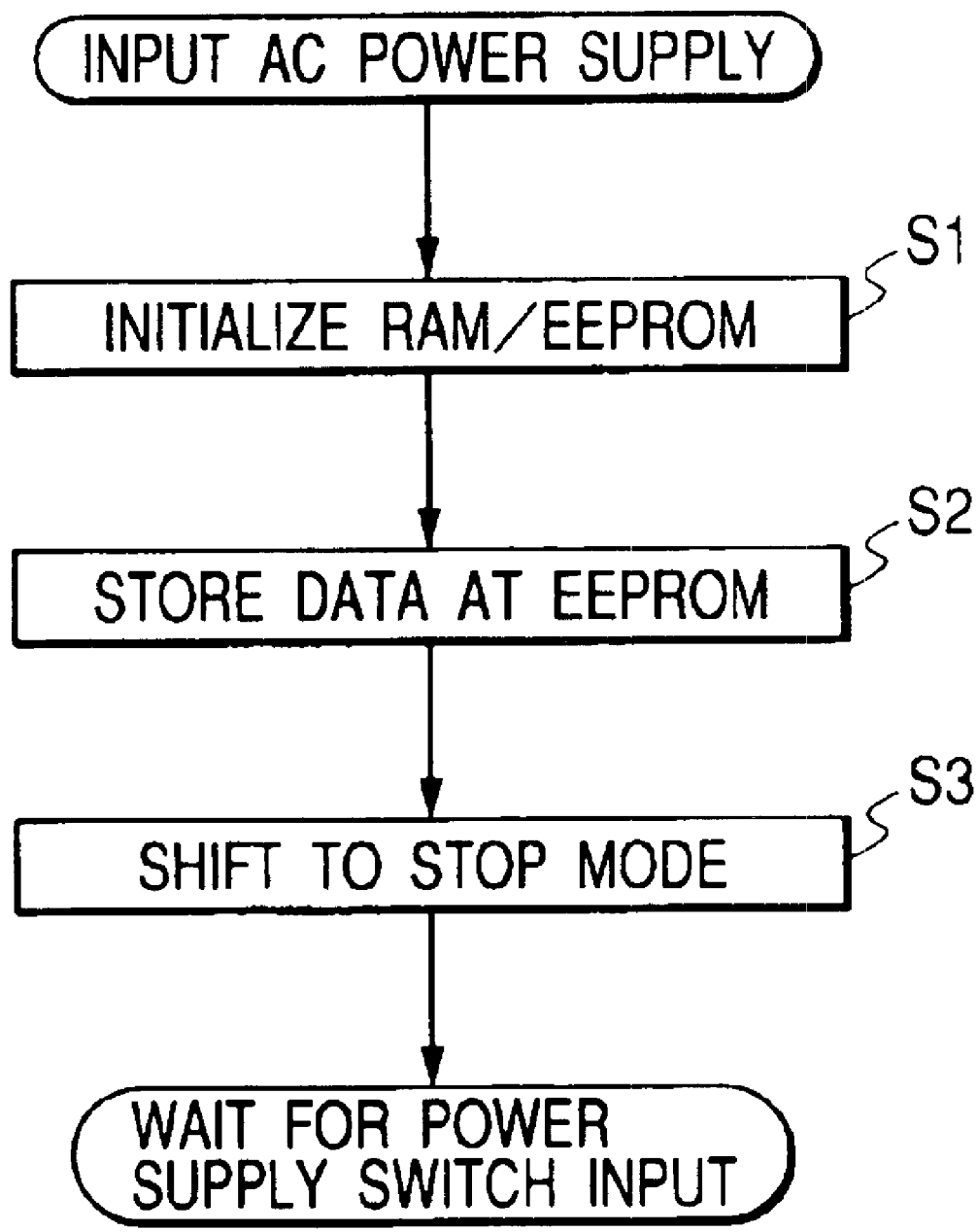
FIGS. 4A and 4B are flowcharts that show the NMI sequence in accordance with the first embodiment.
Figure 4B:
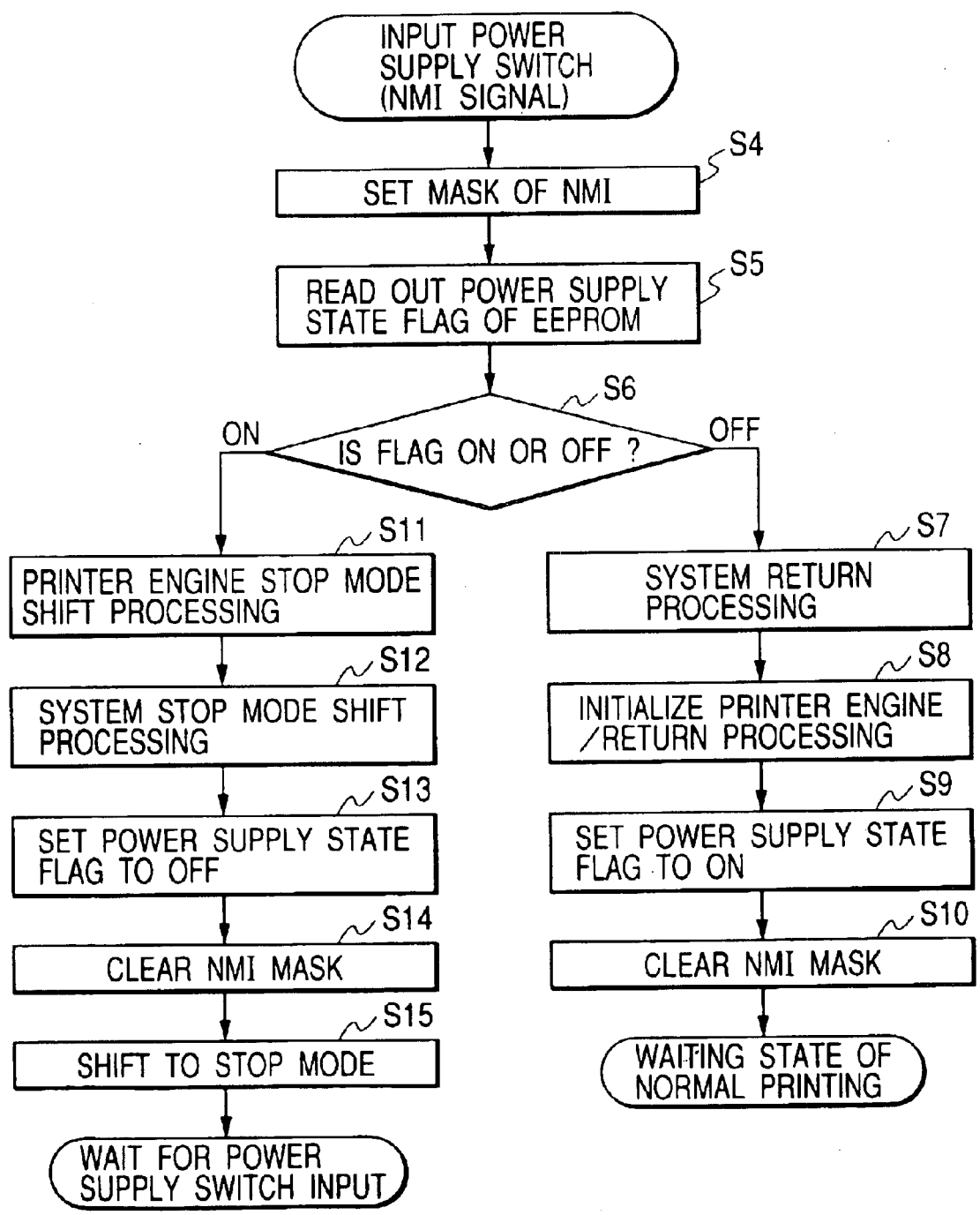
Figure 5:
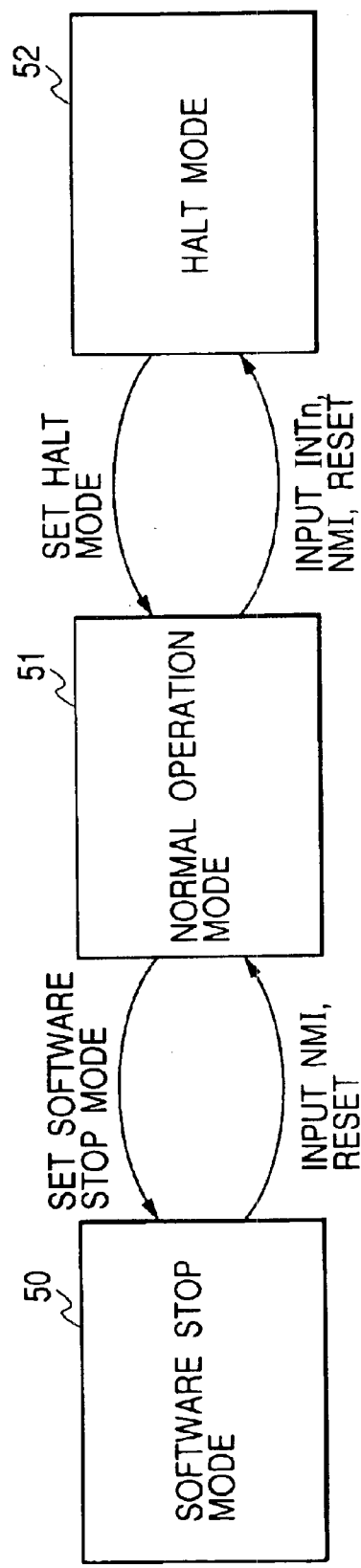
FIG. 5 is a view that shows the shift of the power save status of a CPU.
Figure 6:
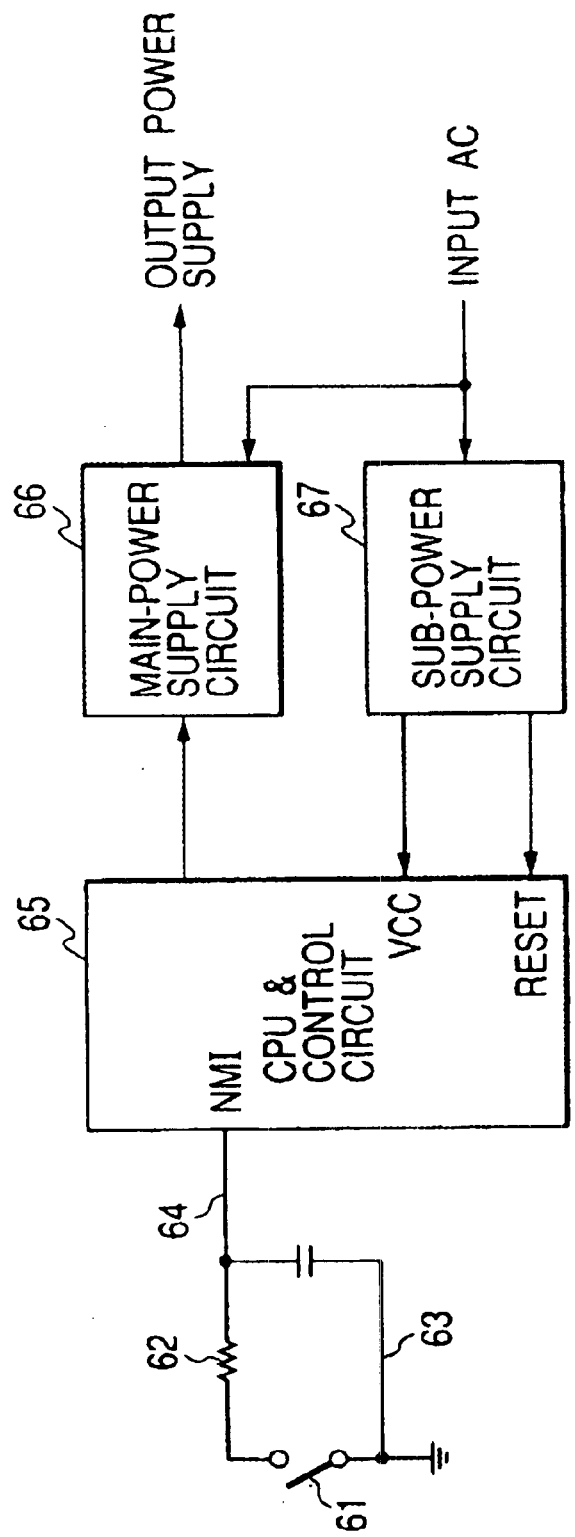
FIG. 6 is a view that shows the conventional embodiment.
Figure 7:
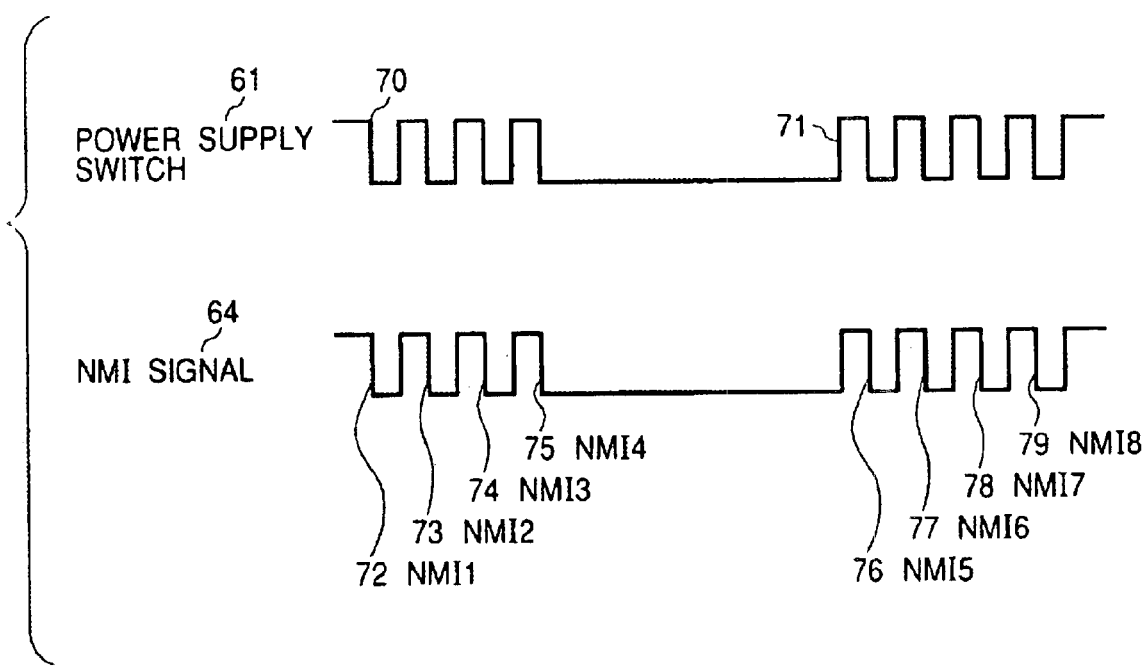
FIG. 7 is a view that shows the generation of NMI signal in accordance with the conventional embodiment.

Here, then, the CPU 200-1 controls the printer 1 by executing the program stored in the ROM 207 in accordance with the flowcharts shown in FIGS. 4A and 4B.

In step S1, the SDRAM 208 serving as the work area, and the non-volatile memory EEPROM serving as a provisional storage of information are initialized. At this juncture, the motor system of the printer is yet to be driven. The power LED 209 is not illuminated, either. In other words, only the initialization process is executed. Also, the NMI Mask register 23 is reset to keep the NMI mask 25 in a state of 0V (hereinafter referred to as a low level). Then, the gate of the gate circuit 26, which is a negative logic product gate (OR gate), is made usable (hereinafter referred to as being enabled). In other words, the status becomes such as to enable the supply of the NMI signal 27 to the NMI input of the CPU 200-1 without logically prohibiting the status transition of signal from the power switch 203. Consequently, the printer does not operate apparently.

In step S2, various parameters needed for the printer, such as the head resistive value and other initially required values for the printer to control the heating given to the head, are stored.

In step S3, after the completion of the initialization process, the program is executed to shift the CPU operational mode from the normal operation mode 51 to the STOP mode 50. For example, the inner register that controls the inner clock of the CPU is set by the execution of the program, hence making it possible to suspend the supply of the system clock signal. In this state, the power supply ON/OFF is on standby. Here, the description has been made of the shifting to the STOP mode 50, but it is possible to effectuate the shifting to the HALT mode 52 by executing the HALT command as a matter of course.

Next, in this state, the current restrictive resistor 28 pulls up the signal from the power switch 203 to the logic voltage, such as 3.3 V (hereinafter referred to as a high level). Consequently, if the power switch 203 is depressed, the signal of the power switch 203 shifts to the low level as shown in FIG. 3. Then, as described in conjunction with the step S1, the gate circuit 26 is enabled to allow the signal of the power switch 203 to pass the gate circuit 26 in the changed status, thus being output to the CPU 200-1 as the NMI signal 27.

With the reception of the NMI signal 27, the CPU shifts the process to step S4, and then, sets the NMI mask register 23 through the address bus 20, data bus 21, address decoder, and chip selection circuit 22 in order not to receive any more NMI signal 27 in the initial step of the NMI processing program.

Figure 3:
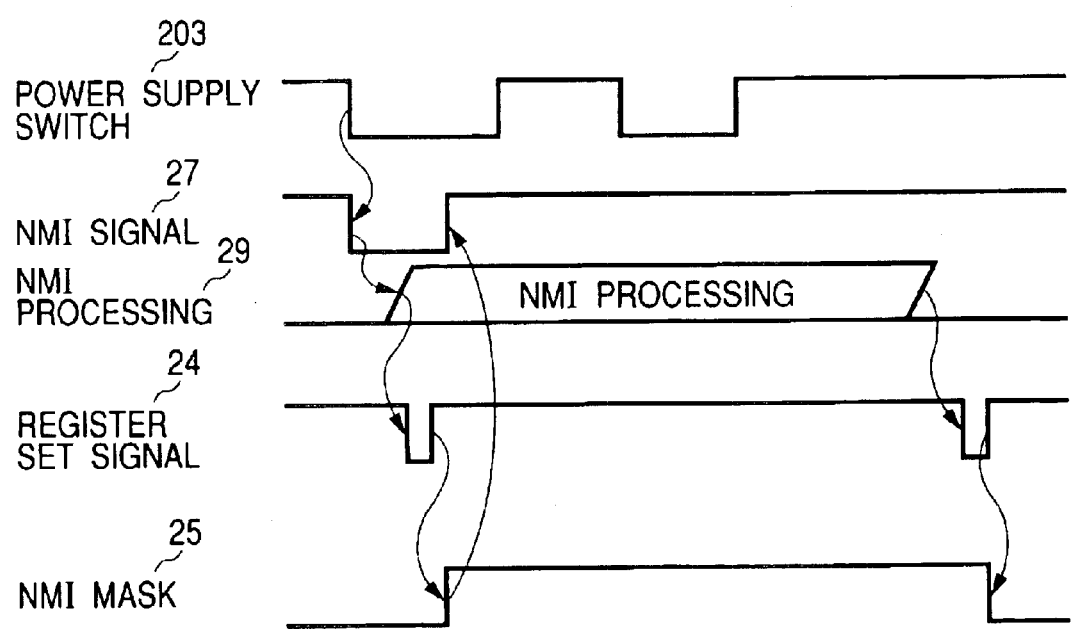
FIG. 3 is a view that shows the generation of an NMI signal in accordance with the first embodiment.

For example, with the output of high-level signal to the data D0 bit of the data bus 21 as shown in FIG. 2, the NMI Mask register 23 is set to the high level from the low level at the rising edge of the register set signal 24 from the address decoder and chip selection circuit 22 as shown in FIG. 3, because the NMI Mask register 23 is the flip-flop of D type. If the NMI Mask register 23 is one set at the high level, the OR gate circuit 26 having the NMI mask 25 connected therewith presents a state of prohibition (hereinafter referred to as being disabled), thus making it impossible to receive any signal from the power switch 203.

Therefore, as shown in FIG. 3, unless the NMI Mask register 23 is reset by the execution of the program, it becomes impossible to receive any more signals of the power switch 203 after the first NMI signal 27 has been received even if it is inputted twice by chattering or the like that may be caused by the depression of the power switch 203.

As a result, it becomes possible to prevent the system malfunction due to any repetition of input that may be caused mechanically or caused by erroneous operation. In this respect, the description has been made of the NMI Mask register as the flip-flop of D type, but it is not necessarily limited to the flip-flop of D type. It is of course possible to adopt the one having latch function or the one having the equal function not necessarily by means of latch. For example, there may be adoptable the JK flip-flop, the RS latch, or a counter such as a timer.

Next, in step S5, the CPU 200-1 reads in a power status flag (not shown) saved on the non-volatile ROM (EEPROM 215) to determine whether the depression of the power switch 203 is in the state of the power supply being OFF or the depression thereof in the state of the power supply being ON, and then, proceeds to step S6.

In the step S6, if the read-in power status flag indicates OFF (low level condition), it is interpreted that the power switch 203 is depressed after initialization, and the process proceeds to step S7 to execute the restoring process of the printer 1 system. In other words, the shifting from the STOP mode 50 to the normal mode 51 is executed. The process proceeds to step S8.

Also, if the power status flag is ON (high level condition), it is interpreted that the power switch 203 is depressed in the state of the power supply being ON, and then, the process proceeds to step S11 for the execution of the power supply OFF to the printer 1. In other words, the shifting from the normal mode 51 to the STOP mode 50 is executed.

The restoration process for the system in the step S7 is such as to illuminate the LED 209, which is the power indicator, for example, and execute the self-check of the system, such as the sum check of the ROM 207 and RAM check of the SDRAM 208, that is, the work area, among some other checks. Then, the CPU 200-1 reads in the minimum information required for the operation of the printer, which is saved protectively on the EEPROM 215, that is, the non-volatile ROM, for avoiding the information loss due to the suspended supply of the clock signal for the system as a whole in the STOP mode 50, and the information thus read in is restored on the SDRAM 208 serving as the work area.

Next, in step S8, the printer engine unit is initialized. In other words, the carriage (not shown) that mounts the head unit 4 is moved to the initial position, and also, the sheet feeding mechanism and other components are moved to the initial position set for the mechanism system. Here, particularly when the printer 1 is of ink jet type, preparation is made by the execution of recovery operation (suction operation) to prevent ink discharge ports from being clogged due to dried ink at the time of non-printing operation so as to be ready for printing. Then, the process proceeds to step S9.

In the step S9, the power supply status flag saved on the EEPROM 215 is set again from the OFF (low level) to the ON (high level), because the current depression of the power switch 203 is for shifting the STOP mode 50 to the normal mode 51.

When the setting of the power supply status flag in the step S9 is completed, the low level is output to the data bus D0 bit in step S10 where the same process as in the step S4 is executed to reset the NMI Mask register 23, thus shifting the NMI mask 25 from the high level to the low level. When the NMI mask 25 is shifted to the low level, the OR gate 26 is enabled again to make it possible to receive the switch depression signal from the power switch 203 thereafter. In this state, the printer 1 is completely initialized to wait for data signals from the host computer (not shown).

Next, the description will be made of the case is where the process shifts from the step S6 to step S1.

In the step S11, the shifting process to the STOP mode 50 is executed for the printer engine unit 3 in order to turn OFF the power supply of the printer. If the printer 1 is engaged in printing or the like, the printing is suspended and the recording sheet currently in print is expelled subsequently. Also, the carriage is controlled to shift to the initial position, among some other operations. Further, in the initial position of the carriage, the printing head unit 4 is completely covered and locked (that is, a capping operation is executed).

If the printer 1 is of ink jet type, this capping is necessary to prevent the ink discharge ports (not shown) of the printing head unit 4 from being dried and clogged. If the carriage unit (not shown) should be stopped carelessly without execution of this process, and the power OFF process is completed, such clogging occurs due to drying. Also, the head unit 4 is damaged due to unwanted movement of the carriage unit.

In step S12, the minimum information required for the next power ON process is saved in the non-volatile EEPROM 215 from among the information currently in use in the work area in order to effectuate shifting of the system as a whole subsequently to the completion of the shifting process of the printer engine unit 3.

In step S13, since the depression of the power switch 203 is for the shift from the normal mode 51 to the STOP mode 50, the power supply status flag saved on the EEPROM 215 is set from the ON (high level) to the OFF (low level).

In step S14, the same process as the step S10 is executed, to reset the NMI Mask register 23, thus changing the NMI mask 25 from the high lever to the low level. When the NMI mask 25 is set at the low level, the OR gate circuit 26 is again in the state of being enabled to make it possible to receive the signals that indicate the switch depression from the power switch 203 thereafter.

In step S15, the CPU 200-1 executes the program stored on the ROM 207 to turn off the illumination of the LED 209 serving as the power indicator, thus shifting the operational mode of the CPU from the normal operation mode 51 to the STOP mode 50. For example, with the execution of the program, the inner register is set to control the inner clock of the CPU in order to suspend the supply of system clock signal. In this state, the system is conditioned to wait for the power OFF. Here, the description has been made of the shifting to the STOP mode 50, but it is possible to effectuate the shifting to the HALT mode 52 by the execution of the HALT command as a matter of course.

In the case of the present embodiment described above, it is made possible for the system, which utilizes the STOP mode and HALT mode of the CPU for lessening the power consumption of the system, to effectuate the interrupt prohibition arbitrarily when the NMI signal, which is the process interrupt of the highest priority of the CPU serving as restoration means from the STOP mode and HALT mode, and also, which is the interrupt unable to be arranged for the interrupt prohibition, is utilized for the ON/OFF control of the power supply.

Also, it becomes possible to receive the NMI signal only once exactly even if an inexpensive switch of mechanical contact type that may generate chattering at the NMI terminal is connected for use. It is also made possible to effectuate interrupt prohibition arbitrarily if it is not desired to receive the NMI that is the interrupt of the highest priority in executing the programmed process.

Furthermore, there is an advantage that depending on the setting condition of the prohibition period that may be controllable by use of the program, it may be possible to arrange the period of the NMI interrupt simply as the chattering prohibitive function if the prohibition period is set at a period of several 100 mS, for example. Also, if it is arranged to set the NMI mask register in the first step and last step of the process of a specific program, it becomes possible to precisely execute the operation of such specific program.

Also, the printer ON/OFF information, such as the power supply status flag, is saved in the non-volatile EEPROM storage, thus making it possible to control the ON/OFF operation of the printer exactly with reference to the data when the power switch is turned on.

Second Embodiment

For the first embodiment, the description is made using the flip-flop of D type. However, FIG. 8 shows an embodiment in which the NMI Mask is used only for a specific time by means of a timer circuit.

Figure 8:
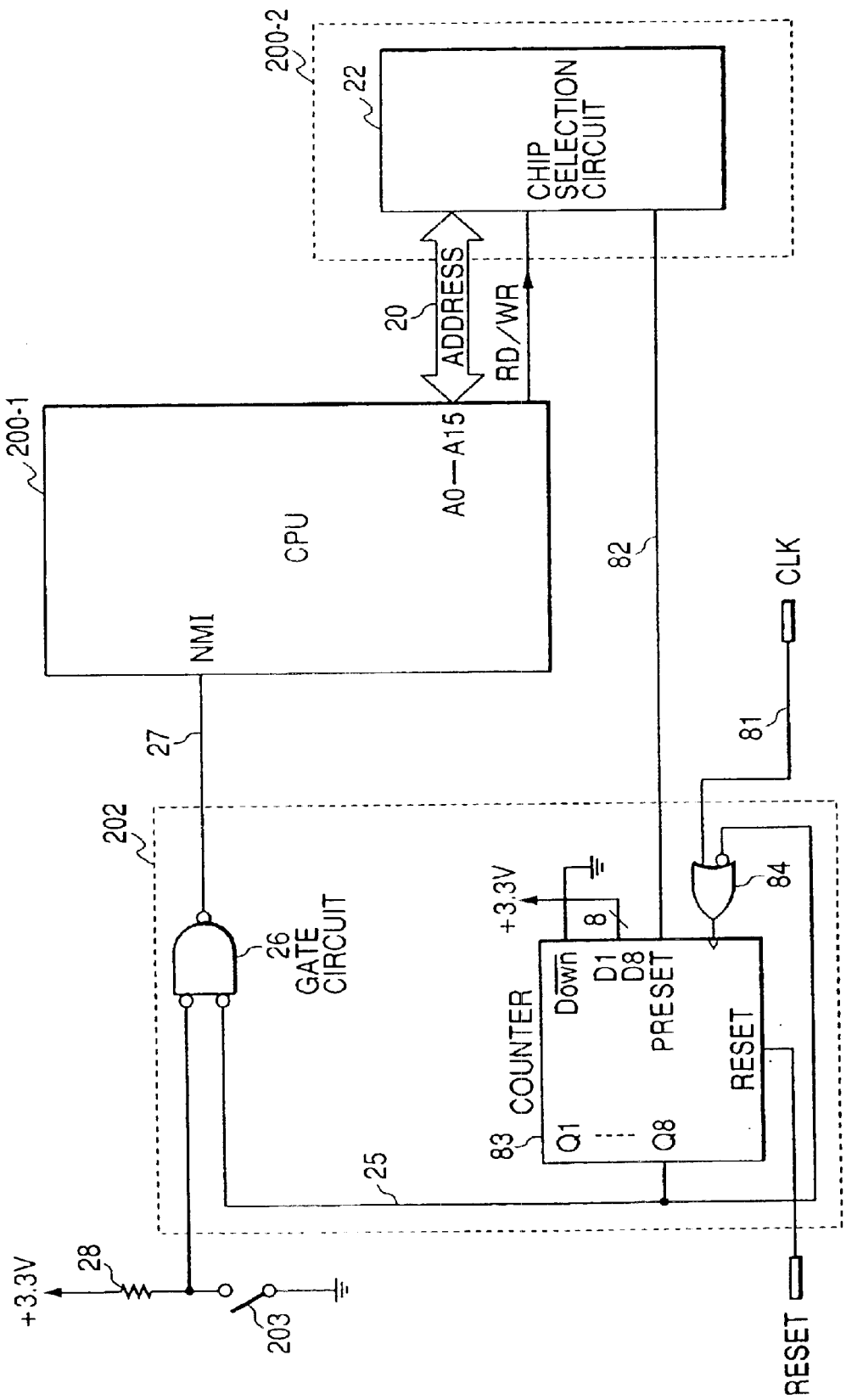
FIG. 8 is a block diagram that shows the details of a second embodiment.

In FIG. 8, a reference numeral 81 designates the clock signal for use of time measurement of a timer counter 83, which is the crystal oscillator 201 shown in FIG. 1A, that is, the system clock of 48 MHz oscillated by the oscillation circuit (not shown) incorporated in the CPU 200-1.

The specific time is determined by the relationship between the frequencies of the measuring system clock signal 81 and the measurement of the timer counter. Also, it is needless to mention that a longer time setting is possible for the system that operates with the clock signal of lower frequencies.

A reference numeral 82 designates the time reset signal that controls the initiation of the measurement of the timer counter 83, which can be a down counter provided with the presetting function for measuring time by counting the clock signals. Here, an up counter or a counter having any other circuitry structure can be used if such counter is functional as a timer by measuring clock signals.

Here, in conjunction with FIG. 8, the description will be made of the operation of any parts that differ from the first embodiment represented in FIG. 2.

With the AC input for the power supply unit 5, the supply of Vcc, which is the system power supply, begins, and the outputs Q1 to Q8 of the timer counter 83 are all reset to the low level by the reset signal 85 of the power supply reset IC 210. At this time, the gate circuit 26 serving as the NMI mask gate is enabled to receive the input of the power switch 203. On the other hand, since the NMI mask 25 of the clock gate 84 is at the low level, the output of the clock gate 84 is fixed at the high level, and the clock signal 81, which is the other input of the clock gate 84, is ignored to suspend the measurement of the timer counter 83.

Next, as described in conjunction with the first embodiment, the CPU 200-1 receives the NMI signal 27 by the depression of the power switch 203. Then, the timer preset 82 is output from the under logic circuit 200-2 in the first step of the NMI processing program.

With this timer preset 82, all the preset input values D1 to D8 of the timer counter 83 are set at the high level. Therefore, the outputs Q1 to Q8 of the timer counter 83 are all preset at high level (FFFF).

With the preset, the output Q8 of the timer counter 83, which is NMI mask 25, is set at the high level to disable the gate circuit 26. Therefore, the depression of the power switch 28 is made no longer receivable thereafter. Also, the clock gate 84 is enabled to output the clock signal of the clock 81. The timer counter 83 begins counting down in accordance with the input of the clock signal 81.

The counting down continues until the output Q8 of the timer counter 83 becomes the low level. Then, counting comes to a stop at that time. When the counting comes to a stop, the gate circuit 26 is enabled to make it possible to receive again the depression of the power switch 203. In the description hereof, the preset value is all set at the high level, but it may be possible to set a specific time arbitrarily if the arrangement is made to enable the CPU 200-1 to set any value arbitrarily.

As described above, it is possible to mask the NMI signal for a specific time only by the trigger output once to the timer counter 83 to begin counting in the first step of the NMI processing program, and also, if only the structure is arranged to make the frequencies of the counting clock signal and counting number of the counter variable, it becomes possible to set the masking time arbitrarily, and there is no need for controlling it at all the time.

In other words, in accordance with the first embodiment, the NMI Mask begins and terminates under the control of a CPU 200-1 by the execution of a control program. However, in accordance with the second embodiment, only the initiation of the NMI Mask is controlled by use of the program. Thus, it becomes possible to lighten the load given to software, and once the timer is triggered, a specific period of time is measured by use of hardware. In this way, the releasing of NMI Mask is arranged. For the timer circuit, it may be possible to adopt a counter type circuit that measures clock signals, a delay circuit that forms the time constant circuit using resistors and capacitors, or a single stable multi-vibrator.

Third Embodiment

Next, the description will be made of the representation in FIG. 9. Here, the first and second embodiments exemplify the system that utilizes NMI for the intended low power consumption, and only the NMI mask 25 controls the signal of power switch 203. For the third embodiment shown in FIG. 9, however, a function is added to prevent the motors 302, 303, and 304, as well as the motor driving circuits 219 and 220, from being damaged due to the flow of abnormal current running in the motors 302, 303, and 304 if the printer 1 should be actuated with the depression of the power switch 203 while the power supply unit 5 shown in FIG. 1B is out of order to make the driving voltages VM, VH, and others abnormal for the system mechanism of the printer 1.

Also, if the printer 1 is of ink jet type, the heater 400 is installed on the head unit 4 as described earlier. Then, the sensor 401 is provided for the temperature control of the heater 400. Therefore, it is arranged for the CPU 200-1 to be able to control the gate circuit of the NMI control circuit 202 in accordance with the information from the heater sensor 401 when the heater 400 generates abnormal heat due to the malfunction of the VH power control 211 or the like and to prohibit the power supply from being inputted again until the temperature of the heater 400 is lowered to a designated value.

Figure 9:
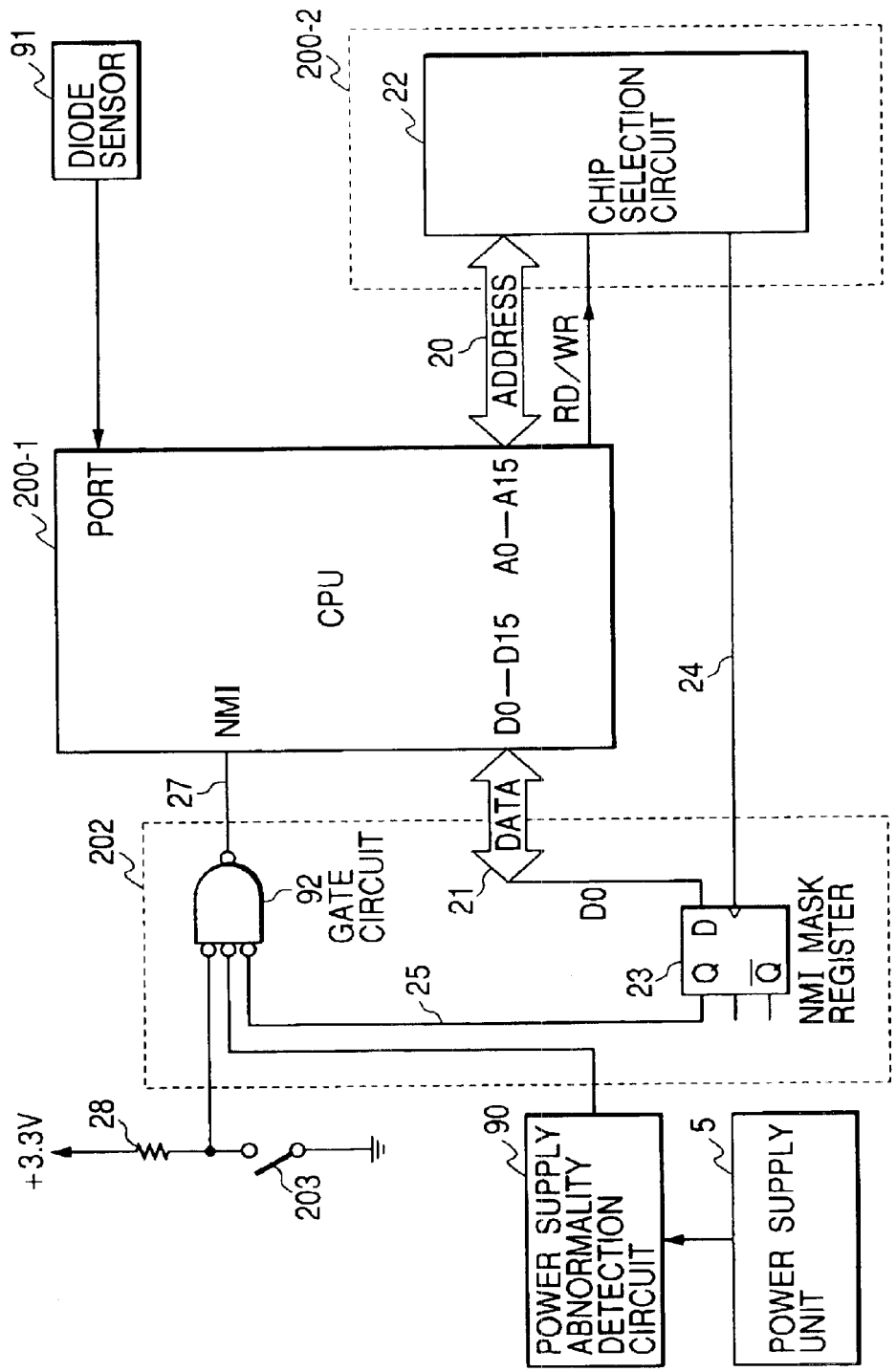
FIG. 9 is a block diagram that shows the details of a third embodiment.

FIG. 9 is a view that shows the third embodiment in detail, in which a reference numeral 90 designates the abnormal power supply detection circuit that detects abnormality of the direct current power supply, such as an output of excessive voltage, from the power supply unit 5. This circuit is structured to detect abnormality of power supply by comparing a given referential voltage and the output from the power supply unit 5. For example, the circuit presents a high level output in the normal case, and a low level output in the abnormal case. Generally, an integrated circuit (IC), such as a voltage comparator, is used for this circuit.

Here, a reference numeral 91 designates the rising head temperature detection circuit formed by a diode sensor 401 and an amplifier 214, which detects the temperature of the heater 400 installed on the head unit 4 shown in FIG. 1A. The CPU 200-1 reads the output of the rising head temperature detection circuit through an input circuit, thus examining the head temperature. As a method for detecting the temperature, it may be possible to input into the CP 200-1 a linear value from the sensor subsequent to the analog-digital conversion thereof.

A reference numeral 92 designates a three-input logical gate (OR gate) circuit that logically processes the output from the power switch 203, the abnormal power supply detection circuit 90, and the NMI Mask register 23, thus controlling the NMI signal 27.

In conjunction with FIG. 9, the description will be made of the parts that differ from those of the first embodiment shown in FIG. 2.

In the same manner as the first embodiment, the power supply unit 5 outputs each of the power supplies, VCC, VH, and VM with the AC input 6 in FIG. 9. However, the VH and VM are under the control of the CPU 200-1, and the output thereof to each of the driving systems is prohibited by means of the VH power supply control 211 and the head logic power supply control 212. Only the VCC, that is, the system logic power supply, is supplied.

At this time, the CPU 200-1 executes the program stored on the ROM 207 to control the printer 1 as shown in the flowcharts in FIGS. 4A and 4B.

In the step S1, the SDRAM 208 work area and the provisional storage of information, that is, the non-volatile EEPROM are initialized. At this juncture, the motor system of the printer is not driven. The power LED 209 is not illuminated, either. Only the initialization is executed as an internal operation. Also, the NMI Mask register 23 is reset, and the NMI mask 25 is in a state of 0V (hereinafter referred to as the low level). The gate circuit 26, which is a negative logic product gate (OR gate), is made usable (hereinafter referred to as being enabled). In other words, the NMI signal 27 can be supplied to the NMI of the CPU 200-1 without logically prohibiting the status transition of the signal from the power switch 203. Therefore, the status is such as to present no operation at all apparently.

In the step S2, the various parameters needed for the printer, such as the resistive value of the head required for controlling the head heating, and other initial values required for the printer, are stored.

In the step S3, subsequent to the completion of the operation of such initialization, the operational mode of the CPU shifts from the normal operation mode 51 to the STOP mode 50 by the execution of the program. For example, the inner register that controls the inner clock of the CPU is set by the execution of the program to make it possible to suspend the supply of the system clock signal. In this state, the power supply ON/OFF is on standby. Here, the description has been made of the shifting to the STOP mode 50. However, it is possible to shift to the HALT mode 52 by executing the HALT command as a matter of course.

Here, if the abnormal power supply detection circuit 90 has not detected any abnormal voltage, that is, the gate circuit 92 is not in the state of being enabled with the low level output, the gate circuit 92 outputs NMI signal 27 when the power switch 203 is depressed. The CPU 200-1 sets the NMI Mask register in the initial step in the NMI process as in the case of the first embodiment after having received the NMI signal 27 so as to disable the gate circuit 92, thus receiving no signal from the power switch 203 thereafter.

Also, on the contrary, if the abnormal power supply detection circuit 90 has detected an abnormal voltage, that is, if the gate circuit 92 is in the state of being disabled with the high level output, the gate circuit 92 is disabled irrespective of the status of the NMI Mask register 23 even when the power switch 203 is depressed. Therefore, the gate circuit 92 does not output the NMI signal at all. In other words, the power supply is not turned on even if the power switch 203 is depressed. The gate circuit 92 is not enabled until the detected result of the abnormal power supply detection circuit 90 becomes normal, and the power supply is not enabled until then, and no input thereof is made, either.

On the other hand, the CPU 200-1 examines the temperature rise of the recording head through the rising head temperature detection circuit 91, and if it detects any abnormal temperature rise, the NMI Mask register 23 is set through the user logic circuit 200-2 to make the gate circuit 92 disabled so that it functions to prohibit any depression of power switch 203.

As described above, with the third embodiment, the NMI signal 27, which is a trigger signal for turning the power supply ON, is masked by logically operating the depression of the power switch 203 with the abnormal power supply detection circuit 90 and the output of the rising head temperature detection circuit 91. Then, as described in conjunction with the first embodiment, the power supply input is prohibited with the masking function of the power switch 203, the chattering removal function, and the detection of power supply abnormality as well, hence providing the function to prevent the equipment from being damaged. Also, it becomes possible to protect the recording head by prohibiting the power supply input with the detection of temperature rise of the recording head.

Fourth Embodiment

Figure 10:
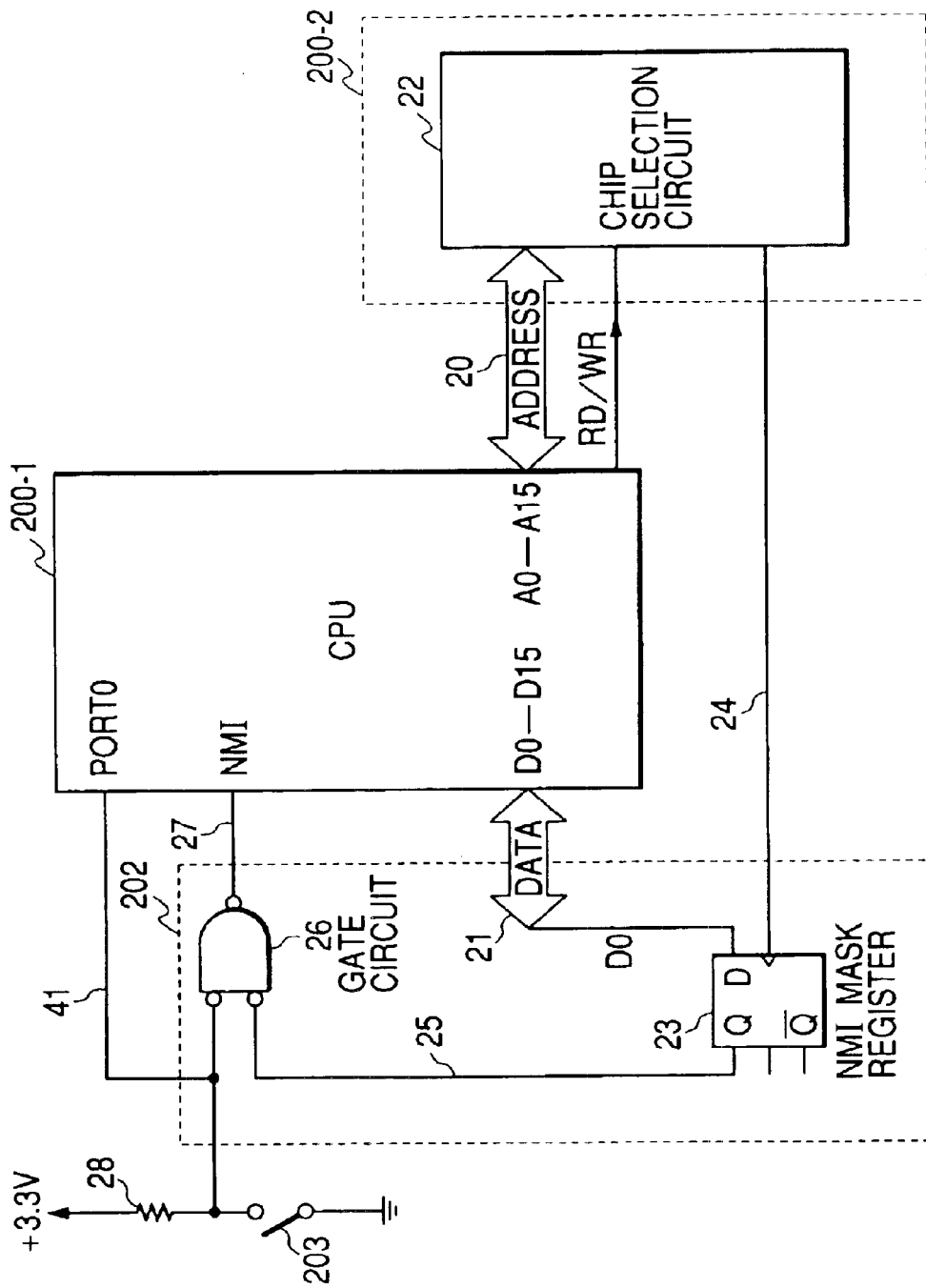
FIG. 10 is a view that shows the details of a fourth embodiment.

In FIG. 10, what differs from the first embodiment is that the switch signal 41 is made confirmable at all times for detecting the status of the power switch 203 depression through the versatile port of the CPU 200-1 even when the NMI mask is made effective. In other words, the CPU 200-1 executes the program stored on the ROM 207 to receive the depression of the power switch 203 as the NMI signal 27 or to read the reception thereof simply as the switch signal 41 irrespective of the masking status of the NMI.

Here, in accordance with the flowcharts shown in FIGS. 11A and 11B, the operation of the fourth embodiment will be described in detail.

At first, in step S111, the SDRAM 208 work area and the non-volatile EEPROM serving as the provisional storage are initialized. At this juncture, the motor system of the printer is not driven. The power LED 209 is not illuminated, either. Only the initialization is executed as an internal operation.

In step S112, the NMI Mask register 23 is reset, and the NMI mask 25 is in a state of 0V (hereinafter referred to as the low level). The gate circuit 26, which is negative logic product (OR gate), is made usable (hereinafter referred to as being enabled). In other words, the NMI signal 27 can be supplied to the NMI of the CPU 200-1 without logically prohibiting the status transition of signal from the power switch 203. Therefore, the status is such that no operation is executed at all apparently.

In step S113, in accordance with the execution of the program after the completion of the operation of such initialization, the operational mode of the CPU shifts from the normal operation mode 51 to the STOP mode 50. For example, with the execution of the program, the inner register is set to control the inner clock of the CPU to make it possible to suspend the supply of the system clock signal.

In this state, the power supply ON/OFF is on standby. Here, the description has been made of the shifting to the STOP mode 50, but the shifting to the HALT mode 52 is also possible by the execution of the HALT command as a matter of course.

Next, in this state, the signal from the power switch 203 is pulled up by use of the normal current restriction resister 28 to the logic voltage, such as 3.3 V (hereinafter referred to as the high level). As a result, with the power switch 203 being depressed, the power switch 203 shifts its status to the low level as shown in FIG. 3. Then, the gate circuit 26 is made enabled as described in conjunction with the step S112, and the changes of signal status of the power switch 203 pass the gate circuit 26 and output to the CPU 200-1 as the NMI signal 27.

At first, the description will be made of the control operation of the power supply ON.

When the CPU receives the NMI signal 27, the process proceeds to step S114 where it terminates without executing any process as the NMI process program but the one designated for returning. Here, the process only functions as a trigger to actuate the system in the STOP mode 50.

Therefore, the system executes the restoring process from the STOP mode 50 by means of the aforesaid triggering so as to set an operable condition. In other words, the process proceeds to step S115 after the system has returned to the status of the inner register (not shown) of the CPU 200-1 and the status of the inner RAM (not shown) immediately before the shifting to the STOP mode 50. Here, however, in consideration of the malfunction that may be caused by noises or the like, only the system around the CPU 200-1 is restored, but the printer 1 is not allowed to operate as a whole.

Next, in step S115, the status of switch depression of the power switch 203 for the generation of the NMI is read though the versatile port 0 of the CPU 200-1, which is characteristic of the present embodiment.

In accordance with the present embodiment, if the switch signal 41 is at 0V continuously in step S116, that is, the port is ON (the low level) logically for the purpose to prevent chattering of the switch signal 41 at the port thus read, it is interpreted that the power switch 203 has been depressed (the power supply is ON).

In step S118, in order not to receive the NMI signal 27 any more, the NMI mask register 23 is set to mask the power switch 203 through the address bus 20, the data bus 21, and the address decoder and chip selection circuit 22 in the same procedure as the first embodiment. Thereafter, under the control of the power supply OFF, the NMI mask register 23 is not cleared immediately before the shifting to the STOP mode 50 by the depression of the power switch 203.

Next, in step S119, the system restoration process is executed, such as to illuminate the LED 209 that serves as the power indicator, and to perform the system self-check like the sum check of the ROM 207 and the RAM check of the SDRAM 208 work area. Then, the minimum information required for the printer operation, which is saved on the non-volatile ROM, EEPROM 215, to avoid the loss of information due to the suspended supply of the clock signal to the system entire body by the STOP mode 50 adopted for the CPU 200-1, is read out and restored to the SDRAM 208 work area. Also, the printer engine unit is initialized likewise. In other words, the carriage (not shown) having the head unit 4 mounted thereon is moved to the initial position, and the mechanism system, such as the sheet conveying mechanism, is also moved to the initial position. Also, particularly when the printer is of ink jet type, the recovery operation (suction operation) that prevents ink discharge ports from being clogged by ink that may be dried during non-operation time is executed to prepare for the printing standby condition and wait for the printing instruction from the host computer (not shown).

Also, in step S116, even if the NMI signal 27 is received as the trigger to the restoration to the normal operation mode 51, it is arranged to interpret such signal as an erroneous signal, such as noise, unless the power switch 203 is depressed exactly (unless the power switch 203 is depressed three times consecutively for the present embodiment), and then, the process proceeds to step S117 where the shifting to the STOP mode 50 is effectuated again, thus making it appear that no step has been taken here.

Next, the control of the power supply OFF will be described.

As described earlier, once the system is actuated, the printer 1 is in the normal operation mode 51, and the gate circuit 26 masks the NMI signal 27. Thus, it is not generated twice even if the power switch 203 is depressed again. In this state, the program stored on the ROM 207 executes the control of the power supply OFF. For example, it is executed by means of the event control effectuated by the interrupt process of the timer (not shown) incorporated in the CPU 200-1.

In other words, the timer event occurs periodically even when printing is on standby. Here, for example, the timer event occurs per 10 mS.

Now, when an interrupt occurs as the timer event, the same process as in the step S115 and S116 is executed in step S120 and step S121, and the switch signal 41 from the versatile port of the CPU 200-1 is examined as to whether or not it is at the low level exactly.

In this respect, whether or not the port is ON (low level) is examined three times consecutively. If affirmative on the three times, the process proceeds to step S122 where the power supply OFF is executed. On the other hand, if the switch signal 41 thus read out from the port is at the high level, it is interpreted that there is no depression of the power switch 203. Then, the interrupt process terminates without executing any process.

In the step S122, the shifting to the STOP mode 50 is executed for the printer engine unit 3 in order to turn OFF the power supply to the printer. If the printer 1 is midway through the printing operation, the printing is suspended, and subsequently, the sheet in printing is expelled.

Also, the movement of the carriage to the initial position is controlled, among some other operations. Further, the printing head unit 4 is completely covered and locked (that is, a capping operation is executed) on the initial position of the carriage.

When the printer is of ink jet type, this process is executed to prevent the ink discharge ports (not shown) of the printing head unit 4 from being clogged due to dried ink. If the carriage unit (not shown) is suspended carelessly without the execution of this process, and the power supply OFF process is completed, the clogging may ensue due to ink drying. Also, the unwanted movement of the carriage unit damages the printing head unit 4.

In step S123, among the information currently in use in the work area, the minimum information required for the next power supply ON is saved on the non-volatile ROM, EEPROM 215, for the shifting of the system after the completion of the shifting process of the printer engine unit 3.

In step S124, the NMI mask register 23 is reset to shift the status of the NMI mask 25 from the high level to the low level. When the NMI mask 25 is at the low level, the gate circuit 26 is again enabled to make it possible to receive the switch depression signal from the power switch 203 thereafter.

In step S125, the CPU 200-1 executes the program stored on ROM 207 to turn off the LED 209 serving as the power indicator, and shifts the CPU operation mode from the normal operation mode 51 to the STOP mode 50. For example, the inner register that controls the CPU inner clock is set by the execution of the program, thus suspending the supply of the system clock. In this state, the system is in a state of waiting for the power supply OFF. Here, the description has been made of the shifting to the STOP mode 50, but by the execution of the HALT command, it is possible to shift to the HALT mode 52 as a matter of course.

For the fourth embodiment, the NMI signal from the power switch 203 is used only as the so-called wake up signal for the actuation with the STOP mode 50. In this case, no process is executed at all as the NMI process. Here, there is an advantage that with the monitoring of the status of the power switch 203 from the versatile port in this manner, it becomes unnecessary to keep the status of the power supply in a storage as in the case of the first embodiment. Also, for the system actuated by means of the NMI interrupt, the masked status remains unchanged. As a result, there is no possibility that the NMI is actuated by the influence of noises during the operation.

It is of course possible to apply the fourth embodiment to the second and third embodiments.

As described above, the suction operation is exemplified as the recovery operation for each of the embodiments, but there is no problem if the wiping operation is adopted to remove ink from the nozzle surface of the head. Also, there is no problem if these operations are combined for the purpose.

Also, the capping operation is exemplified as the protection operation, but there is no problem that the aforesaid recovery operation is executed before capping.

Also, it is not necessary to limit the gate circuit to the OR gate. Any structure is sufficient if it can gate a signal, such as the structure formed by the AND gate circuit.

In accordance with the present invention, it is possible to implement the on/off control of the power supply by receiving the NMI signal exactly even if chattering takes place at the NMI terminal when the NMI signal of the CPU, which is restoring means from the stop mode or halt mode, is utilized for controlling the on/off of the power supply in the control circuit that includes the CPU that utilizes the CPU stop mode or halt mode in order to lessen the power consumption of the control circuit.

What is claimed is:

1. An ink jet recording apparatus for executing recording with use of a recording head, said apparatus provided with a CPU having plural modes including a mode to reduce power consumption by suspending a clock signal as an operational mode, and receiving a signal from power switching means as an NMI interrupt signal for the execution of an NMI interrupt process, said apparatus comprising:

non-volatile memory means for retaining a power supply status flag;

user logic circuit means for outputting a trigger signal based on a signal from the CPU;

a mask signal generating portion for receiving the trigger signal to generate an NMI interrupt mask signal; and a gate circuit for making the signal from the power switching means invalid by the mask signal;

wherein in the NMI interrupt process, said user logic circuit and said mask signal generating portion are set to prohibit the NMI interrupt, and then a capping operation of the recording head is executed if discriminated that a power supply status flag is ON, and said user logic circuit and said mask signal generating portion are set to cancel prohibition of the NMI interrupt after the capping operation is completed, and then setting is made to shift to a mode for reducing the power consumption.

2. An ink jet recording apparatus according to claim 1, wherein in the NMI interrupt process, if the power supply status flag is OFF, a recovery operation of the recording head is executed, and then the power supply status flag is changed to ON to execute a cancelling process of prohibition of the NMI interrupt after the recovery operation is completed.

3. An ink jet recording apparatus according to claim 1, wherein the recording head is provided with a plurality of recording members including electrothermal converting elements for generating thermal energy for discharging ink.

4. A method for controlling an ink jet recording apparatus for executing recording with use of a recording head, the apparatus provided with a CPU having plural modes including a mode to reduce power consumption by suspending a clock signal as an operational mode, and executing an NMI interrupt process with input of a signal from power switching means as an NMI interrupt signal, the method comprising the NMI interrupt process, the NMI interrupt step comprising:

a first interrupt setting step of setting a user logic circuit and a mask signal generating portion to prohibit the NMI interrupt;

a flag discrimination step of discriminating a power supply status flag retained on non-volatile memory means;

a capping step of causing execution of a capping operation of the recording head if discriminated that the power supply status flag is ON in the flag discrimination step;

a first flag retaining step of retaining the power supply status flag on the non-volatile memory means with the power supply status flag being OFF;

a second interrupt setting step of setting the user logic circuit and the mask signal generating portion to cancel the NMI interrupt prohibition;

a second flag retaining step of retaining the power supply status flag on the non-volatile memory means; and a mode shift step of shifting the operational mode of the CPU to the mode for reducing the power consumption.

5. A method for controlling an ink jet recording apparatus according to claim 4, wherein in the NMI interrupt process, if discriminated that the power supply status flag is OFF, a recovery operation for causing the recovery of recording head is executed and the power supply status flag is retained on the non-volatile memory means with the power supply status flag being ON in said second flag retaining step.

6. A method for controlling an ink jet recording apparatus according to claim 4, wherein the recording head is provided with plural recording members including electrothermal converting elements for generating thermal energy for discharging ink.

* * * * *

UNITED STATES PATENT AND TRADEMARK OFFICE
CERTIFICATE OF CORRECTION

PATENT NO. : 6,926,380 B2 Page 1 of 1
APPLICATION NO. : 10/082182
DATED : August 9, 2005
INVENTOR(S) : Narazaki et al.

It is certified that error appears in the above-identified patent and that said Letters Patent is hereby corrected as shown below:

COLUMN 1
Line 39, "referred to" should read --referred to as--.

COLUMN 2
Line 9, "from," should read --from--.

COLUMN 7
Line 56, "des ignates" should read --designates--.

COLUMN 11
Line 64, "is" should be deleted.
Line 65, "step S1." should read --step S11.--.

COLUMN 12
Line 28, "lever" should read --level--.

COLUMN 19
Line 45, "on/off" should read --ON/OFF--.
Line 48, "stop mode or halt" should read --STOP mode or HALT--.
Line 49, "on/off" should read --ON/OFF--.
Line 51, "stop" should read --STOP--, and "halt" should read --HALT--.

Signed and Sealed this

Twelfth Day of December, 2006

JON W. DUDAS
*Director of the United States Patent and Trademark Office*